US012698047B2

(12) United States Patent
    Aubin-Marchand

(10) Patent No.: US 12,698,047 B2
(45) Date of Patent: Aug. 4, 2026

(54) SUPPORT STRUCTURE FOR CONNECTING AT LEAST ONE SUPPORT WHEEL ASSEMBLY TO A FRAME MEMBER OF A TRACK SYSTEM AND TRACK SYSTEM HAVING THE SAME

(71) Applicant: SOUCY INTERNATIONAL INC., Drummondville (CA)

(72) Inventor: Jeremie Aubin-Marchand, St-Hugues (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 556 days.

(21) Appl. No.: 18/121,756

(22) Filed: Mar. 15, 2023

(65) Prior Publication Data

US 2023/0294779 A1 Sep. 21, 2023

Related U.S. Application Data

(60) Provisional application No. 63/320,418, filed on Mar. 16, 2022.

(51) Int. Cl.
    B62D 55/15 (2006.01)
    B62D 55/104 (2006.01)
    B62D 55/108 (2006.01)

(52) U.S. Cl.
    CPC ........... B62D 55/15 (2013.01); B62D 55/104 (2013.01); B62D 55/108 (2013.01)

(58) Field of Classification Search
    CPC .. B62D 55/15; B62D 55/104; B62D 55/1086; B62D 55/108; B62D 55/116; B62D 55/14; B62D 55/10
    See application file for complete search history.

(56) References Cited

U.S. PATENT DOCUMENTS

| | | | | |
|---|---|---|---|---|
| 4,647,116 A | * | 3/1987 | Trask | B62D 55/108 |
| | | | | 305/132 |
| 2016/0194038 A1 | * | 7/2016 | Jean | B62D 55/244 |
| | | | | 305/15 |
| 2017/0274946 A1 | * | 9/2017 | Vik | B62D 55/15 |

* cited by examiner

*Primary Examiner* — S. Joseph Morano
*Assistant Examiner* — Alex Palmer
(74) *Attorney, Agent, or Firm* — BCF LLP

(57) ABSTRACT

A support structure for connecting at least one support wheel assembly to a frame of a track system for a vehicle comprises at least one plate connecting the support structure to the frame, at least one axle supporting the at least one support wheel assembly, and at least one resilient member having a first surface fixedly connected to the at least one plate and a second surface fixedly connected to the at least one axle. The at least one axle is movable in at least one degree of freedom upon resilient deformation of the at least one resilient member. The at least one axle has an initial position in relation to the plate. The at least one resilient member biases the at least one axle toward the initial position upon movement of the at least one axle away from the initial position.

19 Claims, 28 Drawing Sheets

SUPPORT STRUCTURE FOR CONNECTING AT LEAST ONE SUPPORT WHEEL ASSEMBLY TO A FRAME MEMBER OF A TRACK SYSTEM AND TRACK SYSTEM HAVING THE SAME

CROSS-REFERENCE

The present application claims priority from U.S. Provisional Patent Application Ser. No. 63/320,418, filed on Mar. 16, 2022, the disclosure of which is incorporated by reference herein in its entirety.

TECHNICAL FIELD

The present technology generally relates to support structures for track systems and track systems for vehicles.

BACKGROUND

Certain vehicles, such as, for example, agricultural vehicles (e.g., harvesters, combines, tractors, etc.), construction vehicles (e.g., trucks, front-end loaders, etc.) and recreational vehicles (e.g., all-terrain vehicles, utility-terrain vehicles, side-by-side vehicles, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle. For example, when the vehicle is an agricultural vehicle, the tires may compact the soil in such a way as to undesirably inhibit the growth of crops. When the vehicle is a recreational vehicle, the tires may lack traction on certain terrain and in certain conditions.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable agricultural vehicles to be used in wet field conditions as opposed to its wheeled counterpart. In other conditions, track systems enable recreational vehicles to be used in low traction terrains such as snowy roads.

Conventional track systems do, however, present some inconveniences. When conventional track systems travel over laterally uneven surfaces, wheels can come into contact with drive lugs, which can result in premature wear of the drive lugs of the track, and/or sometimes result in detracking of the track system. Travelling over laterally uneven surface with conventional track systems can also lead to uneven load distribution across the track, which can result in premature wear of the track of the track system.

Therefore, there is desire for a track system that could mitigate the above-mentioned issues.

SUMMARY

It is therefore an object of the present technology to ameliorate the situation with respect to at least one of the inconveniences present in the prior art.

It is also an object of the present technology to provide an improved track system and support wheel assemblies at least in some instances as compared with some of the prior art.

The present technology relates to a support structure for a track system. The support structure has an axle, and a support wheel assembly connected to the axle. The axle is pivotable, thereby allowing the support wheel assembly to pivot. As such, the support structure can better conform to ground irregularities, which reduces wear and improves load distribution on an endless track of the track system.

In the context of the following description, "longitudinally" means in a direction parallel to longitudinal axis of the track system defined by a forward direction of travel of a vehicle having the track system, in a plane parallel to flat level ground, "laterally" means in a direction perpendicular to the forward direction of travel of the vehicle, in a plane parallel to flat level ground, and "generally vertically" means in a direction generally perpendicular to flat level ground. In the context of the present technology, the term "axis" may be used to indicate an axis of rotation. Also, the terms "pivot assembly" and "wheel assemblies" include all the necessary structure (bearing structures, pins, axles and other components) to permit a structure/wheel to pivot/rotate about an axis, as the case may be. Moreover, the direction of forward travel of the track system is indicated by an arrow 45 in the various Figures. In the present description, the "leading" components are components located towards the front of the vehicle defined consistently with the vehicle's forward direction of travel, and the "trailing" components are components located towards the rear of the vehicle defined consistently with the vehicle's forward direction of travel. In the following description and accompanying Figures, the track system is configured to be attached to a right side of the chassis of the vehicle.

According to an aspect of the present technology, there is provided a support structure for connecting at least one support wheel assembly to a frame of a track system for a vehicle, the support structure comprising: at least one plate configured to connect the support structure to the frame; at least one axle configured for supporting the at least one support wheel assembly; and at least one resilient member having a first surface fixedly connected to the at least one plate and a second surface fixedly connected to the at least one axle; the at least one axle being movable in at least one degree of freedom upon resilient deformation of the at least one resilient member; and the at least one axle having an initial position in relation to the plate, the at least one resilient member biasing the at least one axle toward the initial position upon movement of the at least one axle away from the initial position.

In some embodiments of the present technology, the track system defines a longitudinal axis parallel to a forward direction of travel of the vehicle; the at least one axle extends perpendicularly from the longitudinal axis of the track system; and the at least one axle is pivotable about the longitudinal axis of the track system.

In some embodiments of the present technology, the axle is rotatable about the longitudinal axis within a range of motion of between about −15 and about +15 degrees relative to the initial position.

In some embodiments of the present technology, the axle is rotatable about the longitudinal axis within a range of motion of between about −10 and about +10 degrees relative to the initial position.

In some embodiments of the present technology, the at least one plate comprises, at each opposite end thereof, a stopper configured to limit a pivotal movement of the at least one axle about the longitudinal axis of the track system.

In some embodiments of the present technology, the at least one axle comprises: a middle portion; a support wheel attachment portion on at least one side of the middle portion; and at least one sleeve fixedly connected to the at least one resilient member, the at least one sleeve covering the middle portion of the at least one axle.

In some embodiments of the present technology, the at least one sleeve is fixedly connected to the at least one axle.

In some embodiments of the present technology, the support structure is symmetric along a forward direction of travel of the vehicle.

In some embodiments of the present technology, the at least one resilient member is glued to the at least one axle.

In some embodiments of the present technology, the at least one resilient member is over-molded on the at least one axle.

In some embodiments of the present technology, the at least one resilient member has a generally triangular cross-section defined in parallel to the at least one axle, a length of the at least one resilient member perpendicular to the at least one axle extending at least over a major portion of a length of the plate, a middle portion of the at least one axle being inserted at least in part in an aperture of the at least one resilient member defining the second surface of the at least one resilient member.

In some embodiments of the present technology, the middle portion of the at least one axle is maintained in the aperture of the at least one resilient member by use of an interference fit.

In some embodiments of the present technology, the support structure further comprises at least one pair of collars, one collar of each pair being fixedly attached to the at least one plate on each opposite side of the at least one axle along the length of the plate so that the at least one resilient member is fixedly maintained between the at least one plate on the first surface and the at least one pair of collars on a third surface.

In some embodiments of the present technology, the first surface is a generally flat surface of the generally triangular cross-section and the third surface is a curved surface of the generally triangular cross-section opposite from the first surface.

In some embodiments of the present technology, the support structure further comprises at least one set of bolts and at least one corresponding set of nuts attaching the at least one pair of collars to the at least one plate and to the track system.

In some embodiments of the present technology, the at least one pair of collars and the at least one plate impart a pre-determined compression preload on the at least one resilient member.

In some embodiments of the present technology, the at least one plate comprises a raised portion extending parallel to the at least one axle, the raised portion forming a clearance space defined above the at least one axle between the at least one plate and the at least one resilient member, the clearance space allowing the at least one axle to move in a limited range toward and away from the at least one plate without compressing the at least one resilient member.

In some embodiments of the present technology, the at least one resilient member is connected to the at least one axle; and the at least one resilient member is deformable in tension, compression, shear and any combination thereof.

In some embodiments of the present technology, the support structure further comprises at least one nut and at least one bolt configured for mounting the support structure to the frame of the track system.

In some embodiments of the present technology, the at least one resilient member is over-molded over one or more of the at least one axle, the at least one plate, the at least one nut and the at least one bolt.

In some embodiments of the present technology, the first surface of the at least one resilient member is on a first plane thereof and second surface of the at least one resilient member is on a second plane thereof perpendicular to the first plane.

In some embodiments of the present technology, the at least one resilient member comprises a third surface opposite from the first surface, the third surface being concave.

In some embodiments of the present technology, the at least one plate is a first plate; the support structure further comprises at least one second plate; the first surface of the at least one resilient member is connected to the at least one first plate; the second surface of the at least one resilient member is connected to the at least one second plate; the at least one axle is fixedly connected to the second surface of the at least one resilient member via the at least one second plate.

In some embodiments of the present technology, the at least one first plate has a first radius of curvature in a plane parallel to the at least one axle; the at least one second plate has a second radius of curvature in the plane parallel to the at least one axle; the at least one first plate and the at least one second plate define a first virtual pivot point in the plane parallel to the at least one axle for the support structure at a common center of curvature, the at least one axle being positioned between the at least one second plate and the at least one virtual pivot point.

In some embodiments of the present technology, the at least one resilient member comprises two resilient members, one resilient member being positioned on each side of the at least one axle, a void being present between the two resilient members to allow the at least one axle to move by rotation or by vertical translation toward and away from the at least one plate.

In some embodiments of the present technology, a cross-section of the at least one resilient member has a butterfly shape causing deformations of the at least one resilient member to take place for a major part on lateral extremities upon movement of the at least one axle.

In some embodiments of the present technology, the at least one resilient member defines a concavity on each of its lateral sides when the at least one axle is in a resting position, one of the concavities on a first side of the at least one axle being replaced by a bulge defined by the at least one resilient member when the first side of the at least one axle is raised toward the at least one plate.

In some embodiments of the present technology, the support structure is configured so that the bulge defined by the at least one resilient member limits a raising movement of the at least one axle.

In some embodiments of the present technology, the at least one plate comprises a pair of lateral indentations aligned with a length of the at least one axle to allow the at least one axle to rotate about a vertical axis perpendicular to the length of the axle.

In some embodiments of the present technology, the at least one plate comprises: a front top plate, a front bottom plate, a rear top plate, and a rear bottom plate; the at least one resilient member comprises: a front resilient member connected to a lower surface of the front top plate and to an upper surface of the front bottom plate, and a rear resilient member connected to a lower surface of the rear top plate and to an upper surface of the rear bottom plate; a support member fixedly connecting the front and rear bottom plates; and left and right connecting plates pivotably connected to the support member; the at least one axle comprising a front axle and a rear axle, each of the front and rear axles being split into left and right half axles, the front and rear left half axles being attached to the left connecting plate, the front and rear right half axles being attached to the right connecting plate In some embodiments of the present technology, the at least one plate is integral to the frame.

In another aspect of the present technology, there is provided a track system having the support structure according to the above aspect or according to the above aspect and one or more of the above embodiments.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 17a, 17b, 17c, 17d, 17e and 17f respectively are a top front, right perspective view, a top plan view, a bottom plan view, a right side elevation view, a front elevation view and a top front, right perspective, cutaway view of a seventh support structure in accordance with an embodiment of the present technology.

The Figures are not too scale, and relative proportions between the various components of the support structures are not necessarily maintained between the various Figures.

DETAILED DESCRIPTION

Introduction

Some of the above-mentioned issues are mitigated by a track system having a frame and a support system for connecting support wheel assemblies to the frame, the track system and the support system being described in U.S. patent application Ser. No. 17/478,299, filed on Sep. 17, 2021, the disclosure of which is incorporated by reference herein in its entirety. The present disclosure introduces alternative solutions for mitigating these issues.

Before continuing to describe the present disclosure in further detail, it is to be understood that this disclosure is not limited to specific devices, systems, methods, or uses or process steps, and as such they may vary. It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

It is convenient to point out here that "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

Figure 1:
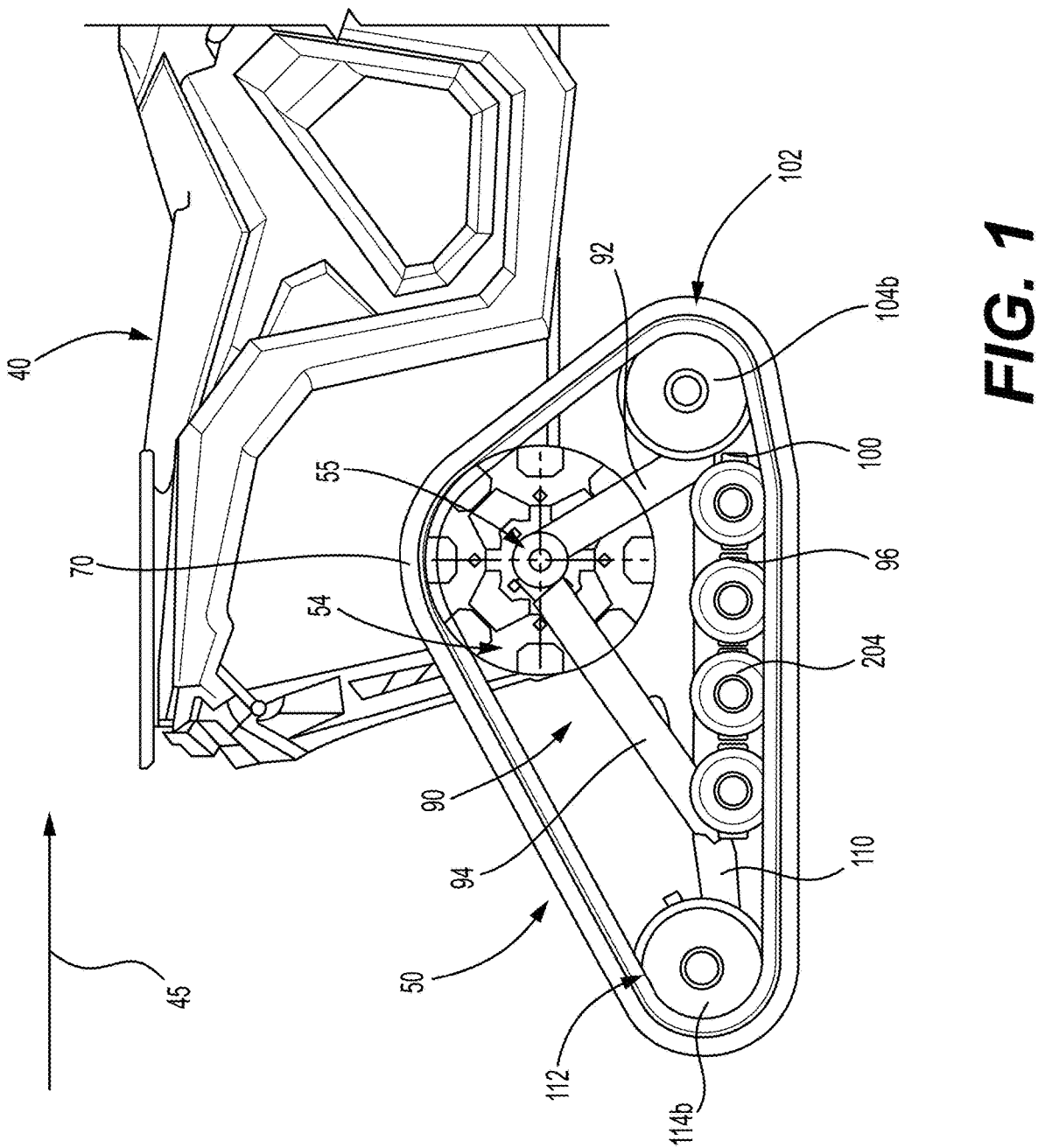
FIG. 1 is a close-up, right side elevation view of an all-terrain-vehicle equipped with a rear, right track system having a support structure in accordance with an embodiment of the present technology.
Figure 2:
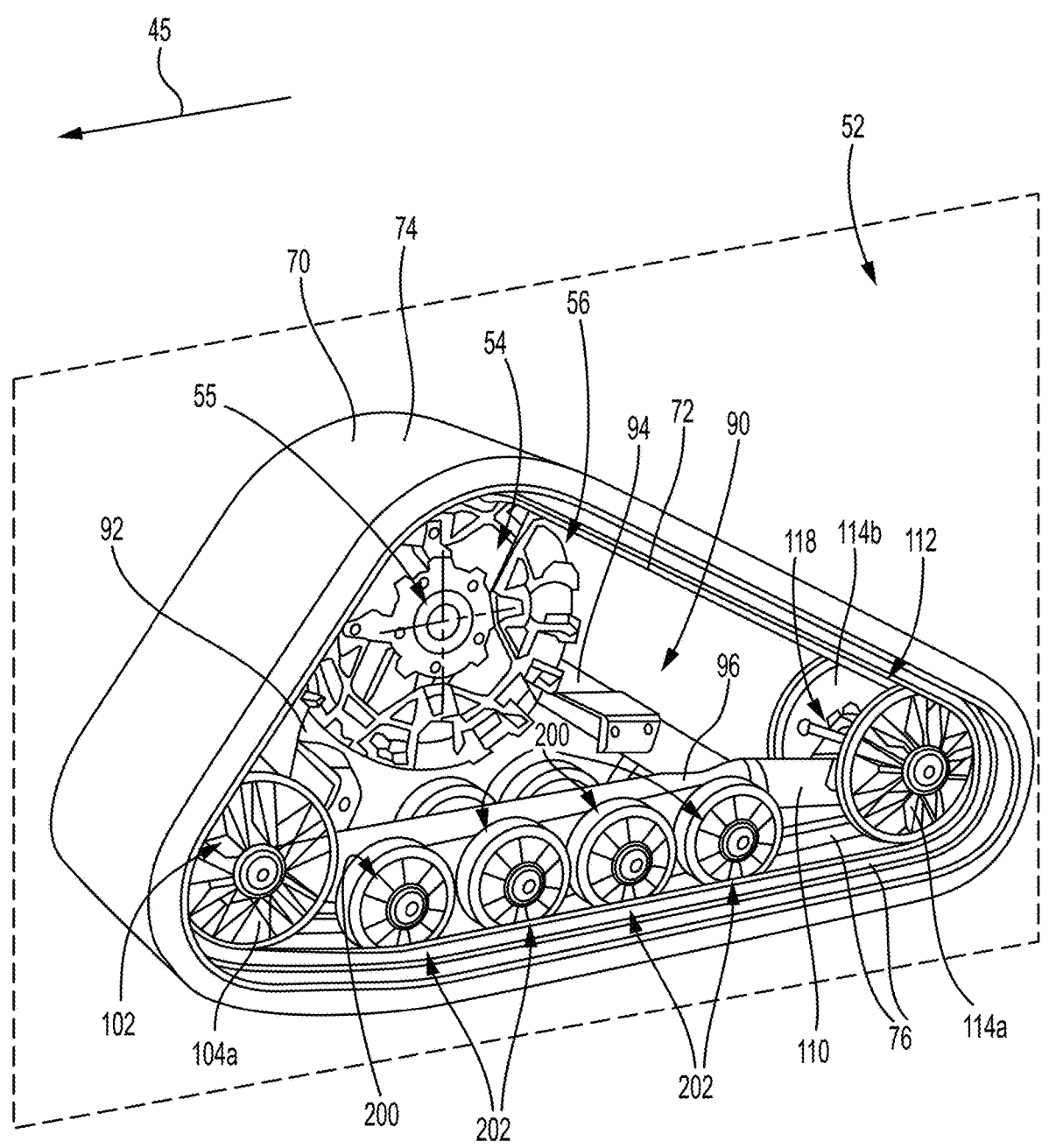
FIG. 2 is a perspective view taken from a top, front, left side of the track system of FIG. 1.

With reference to FIGS. 1 and 2, a track system 50, which has a support structure 200, is illustrated. It is to be expressly understood that the track system 50 and the support structure 200 are merely embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the track system 50 and the support structure 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case.

In addition, it is to be understood that the track system 50 and the support structure 200 may provide in certain aspects simple embodiments of the present technology, and that where such is the case it has been presented in this manner as an aid to understanding. As persons skilled in the art would understand, various embodiments of the present technology may be of a greater complexity than what is described herein.

Figure 3:
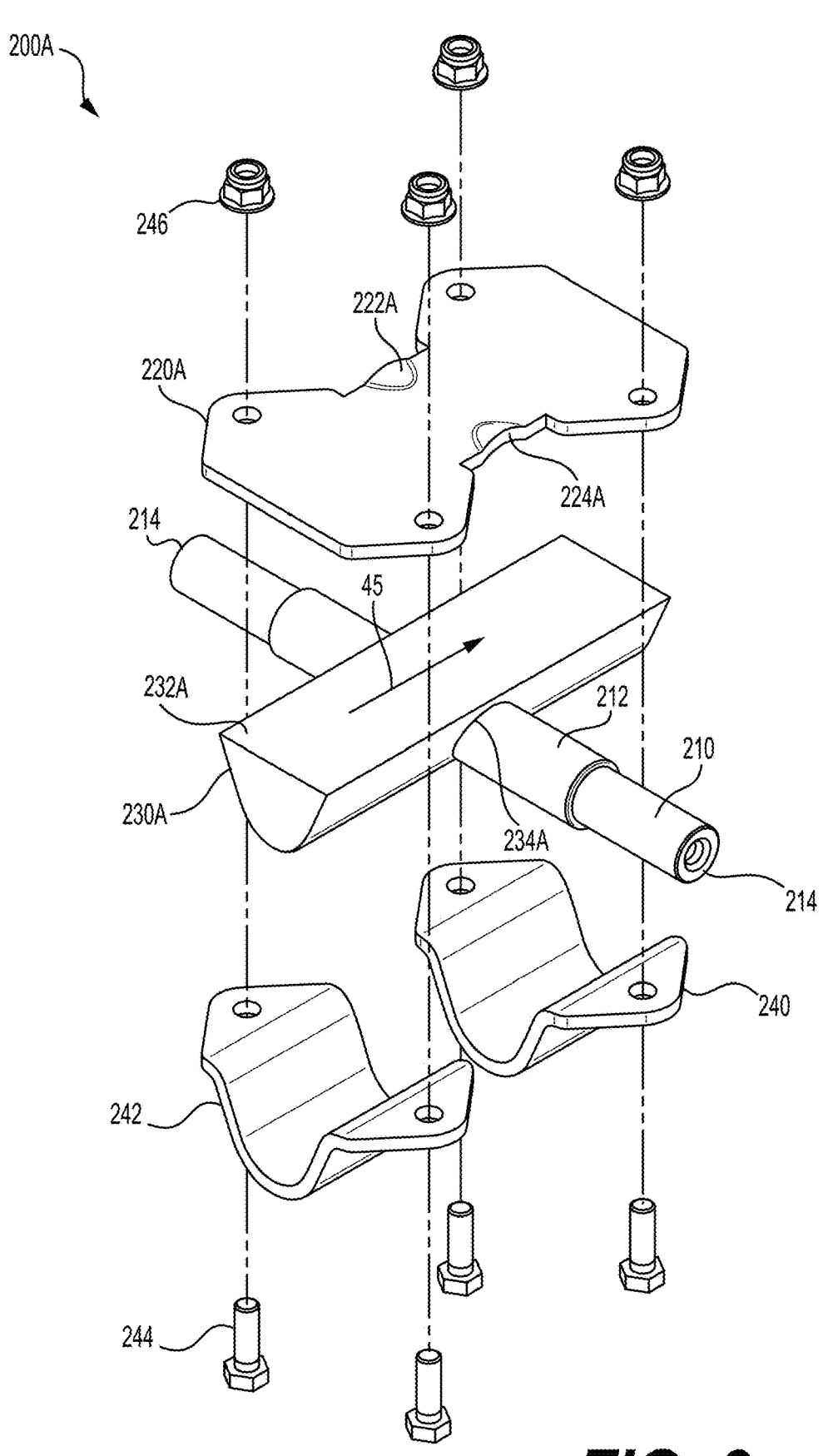
FIG. 3 is a perspective, exploded view taken from a top, front, left side of a first support structure in accordance with an embodiment of the present technology.
Figures 4A, 4B:
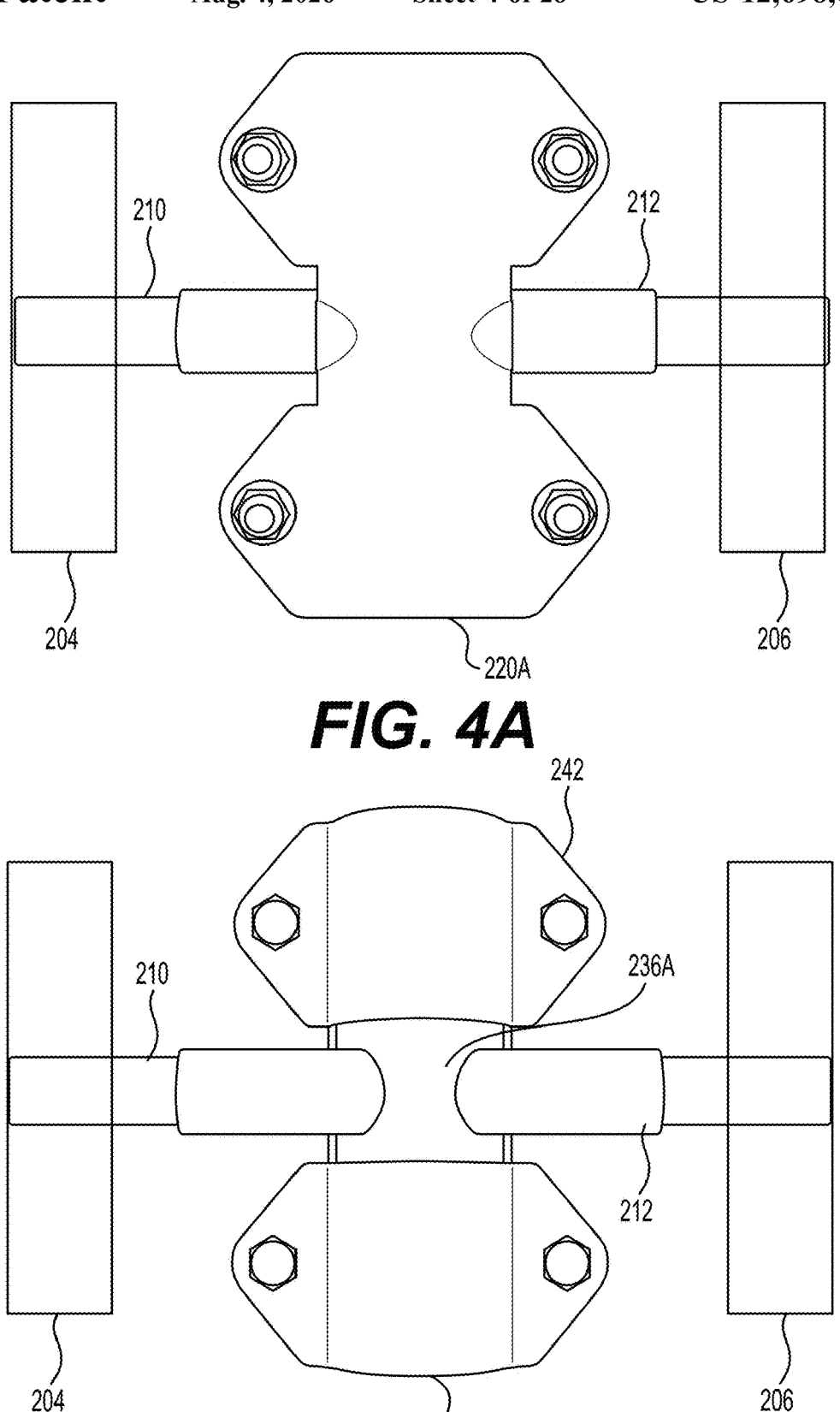
FIGS. 4a, 4b, 4c and 4d are, respectively, top, bottom, front elevation and side elevation views of the first support structure of FIG. 3.
Figure 4C:
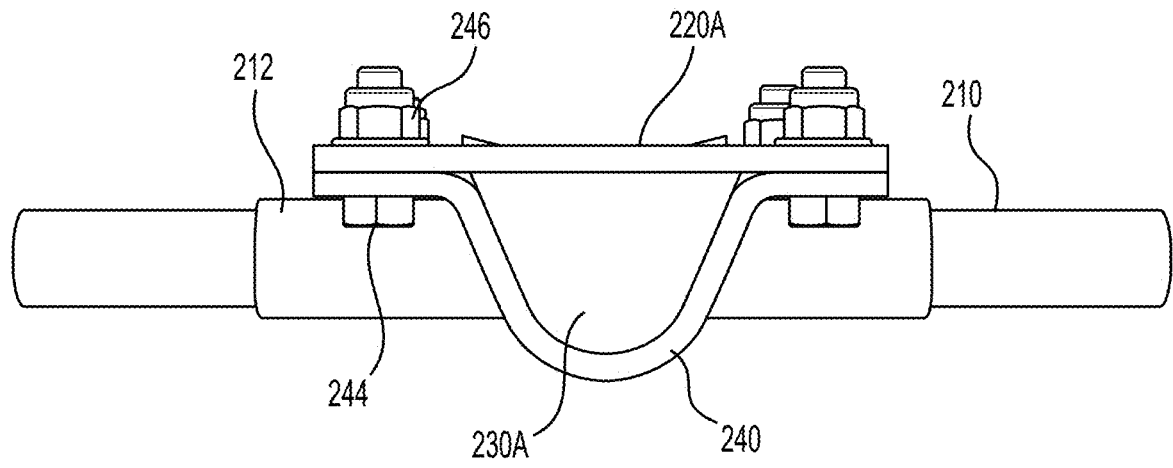
Figure 4D:
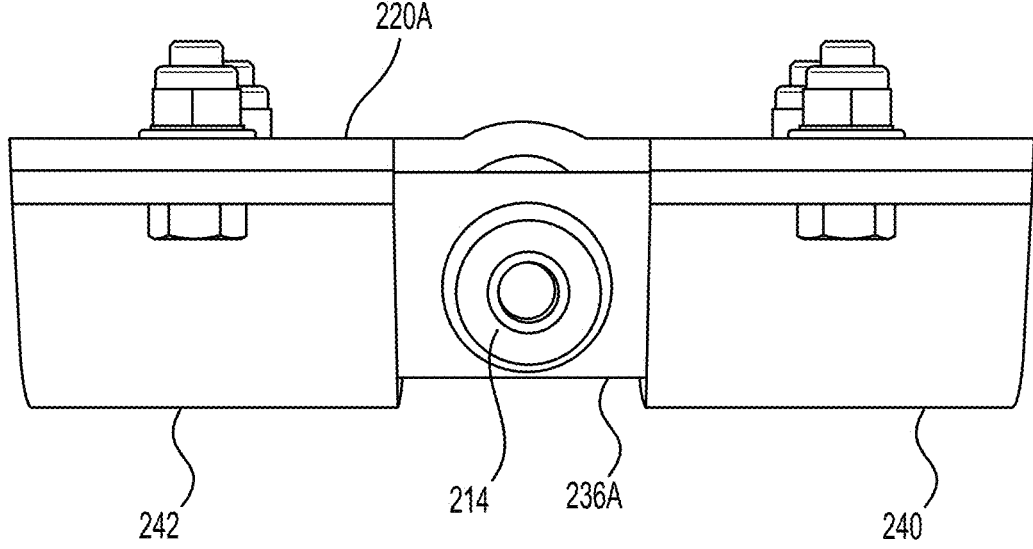
Figure 5:
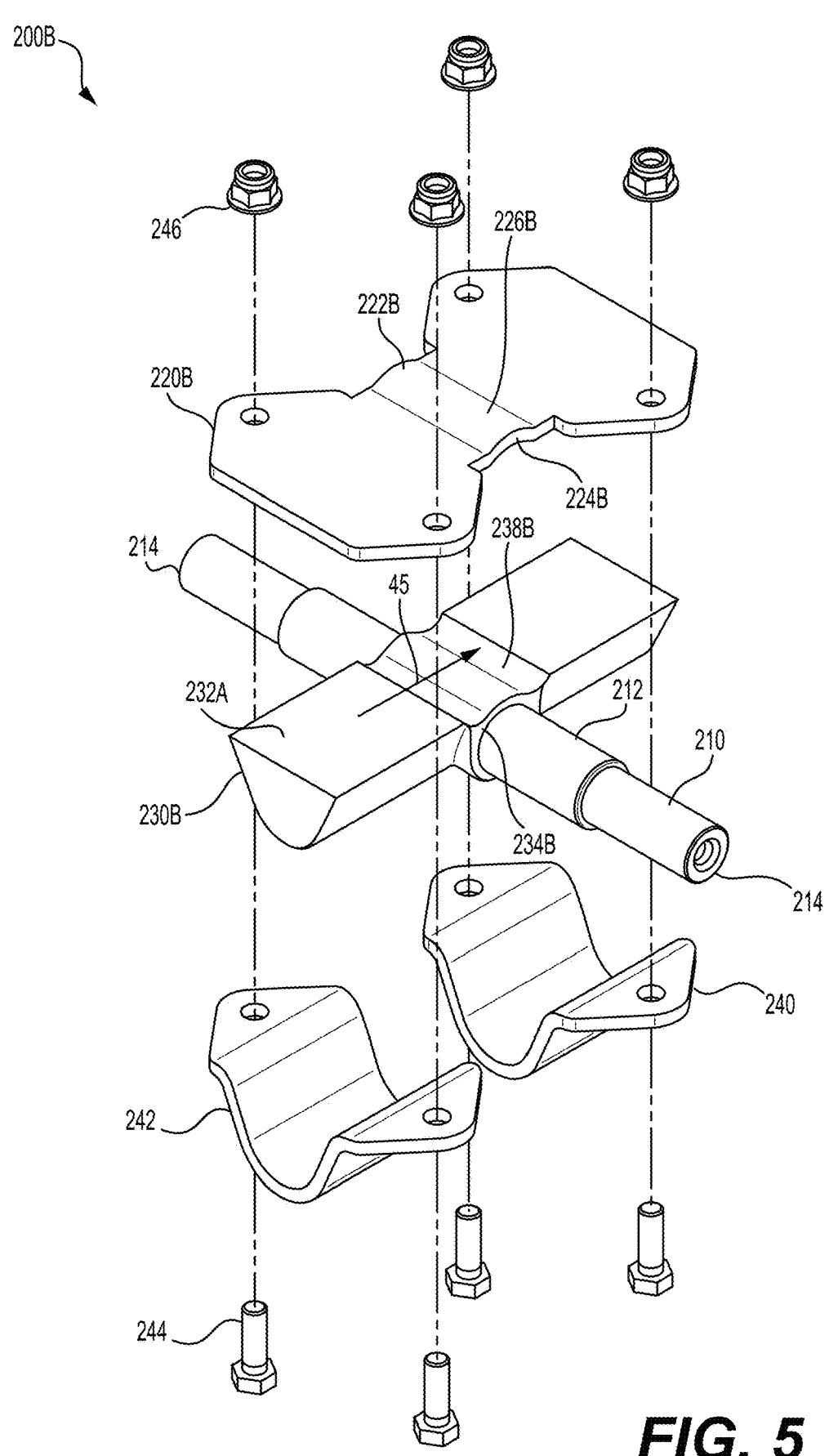
FIG. 5 is a perspective, exploded view taken from a top, front, left side of a second support structure in accordance with an embodiment of the present technology.
Figure 6A:
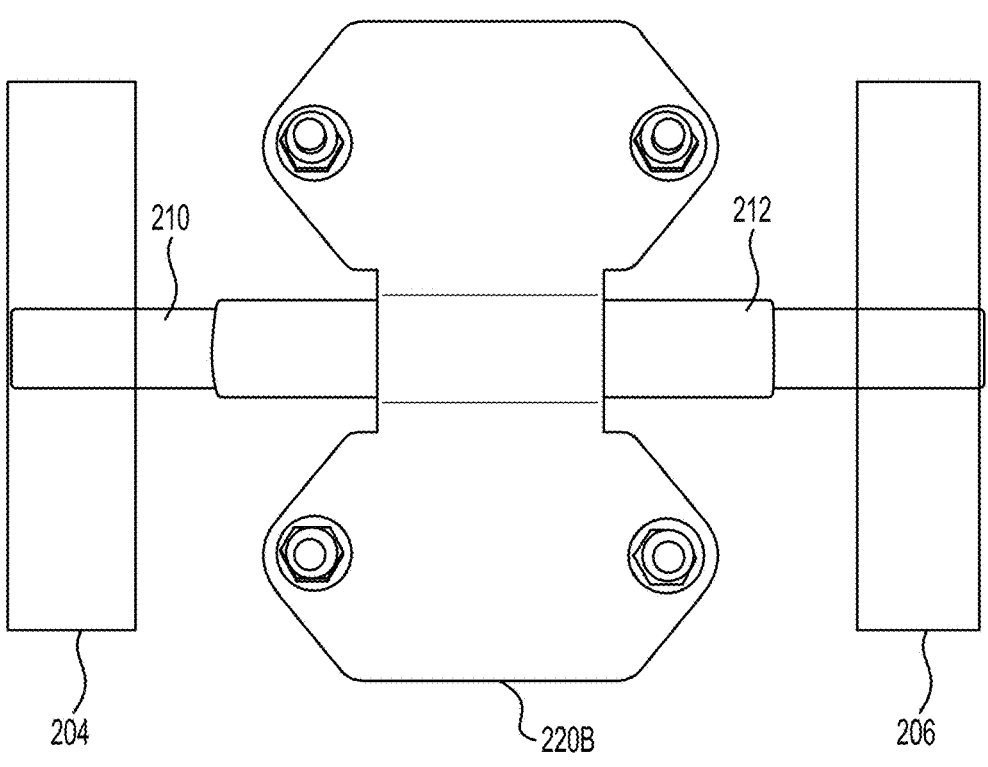
FIGS. 6a, 6b, 6c and 6d are, respectively, top, bottom, front elevation and side elevation views of the second support structure of FIG. 5.
Figure 6B:
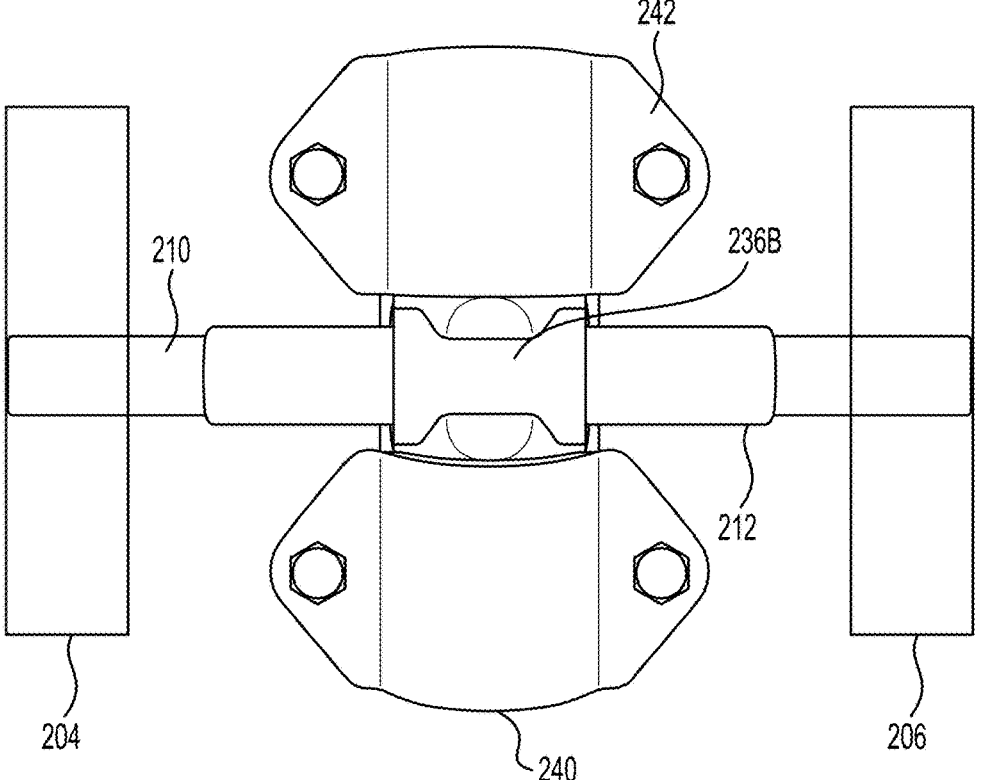
Figure 6C:
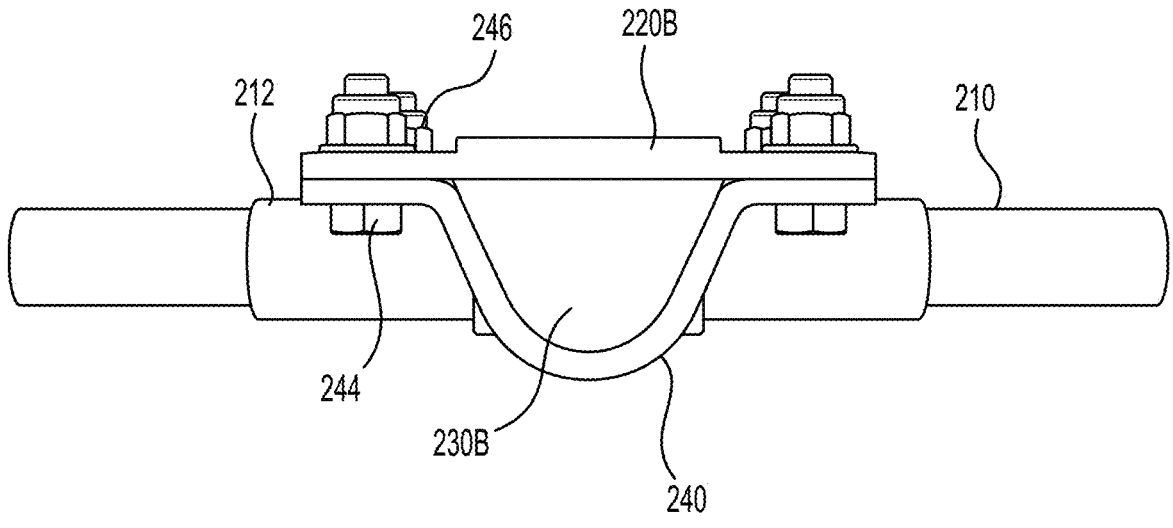
Figure 6D:
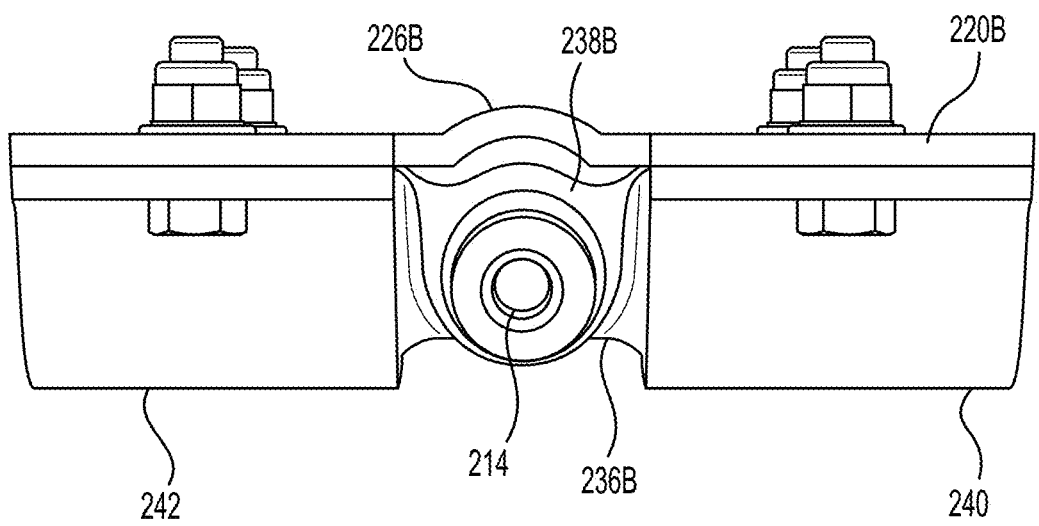

Generally described, the present technology relates to various embodiments of the support structure 200 that are connected to the track system 50, and to track systems 50 including the support structure 200. As will be better understood from the accompanying Figures, the support structure 200 has an axle supporting the support wheel assembly 202. The axle is connected to a resilient member (the axle and the resilient member are first shown on FIG. 3). When resiliently deformed in or more of a number of degrees of freedom, the resilient member biases the axle toward an initial position. The support structure 200 will be presented herein with reference to an all-terrain vehicle 40 shown partially in FIG. 1. As will become apparent from the description below, the support structure 200 may assist the track system 50 to improve load distribution of the track system 50.

All-Terrain-Vehicle

Referring to FIG. 1, the track system 50 is operatively connected to the vehicle 40. The vehicle 40 is an all-terrain-vehicle (ATV). It is contemplated that in alternate embodiments, the vehicle 40 could be a snowmobile, a side-by-side vehicle, a utility-terrain vehicle or another recreational vehicle. It is also contemplated that the vehicle 40 could be a harvester, a tractor, or another agricultural vehicle. Other vehicles are contemplated, and the track system 50 including the present technology is structured and configured to be used on such vehicles. Though only the rear, right track system 50 is shown and described herein, the vehicle 40 includes front right, front left and rear left track systems configured to be operatively connected to their respective corners of the vehicle 40. It is contemplated that in some embodiments, the vehicle 40 could be adapted to receive more or less than four track systems 50. The terms "left" and "right" are used in reference to components of a track system 50 located on a right-hand side of the vehicle 40, without any intent to limit the generality of the present disclosure.

Track System

Referring to FIGS. 1 and 2, the track system 50 has a sprocket wheel assembly 54 which can be operatively connected to a driving axle (not shown) of the vehicle 40. It is contemplated that in some embodiments, the sprocket wheel assembly 54 could be connected to anon-driving axle. The driving axle drives the sprocket wheel assembly 54 such that the sprocket wheel assembly 54 can rotate about a sprocket axis 55 (denoted by a "+" symbol). The sprocket axis 55 is perpendicular to the forward direction of travel of the vehicle. The sprocket wheel assembly 54 defines two sets of laterally spaced recesses 56 that are spaced on the circumference of the sprocket wheel assembly 54. The two sets of laterally spaced recesses 56 are adapted, as will be described in greater detail below, to receive left and right sets of laterally spaced lugs 76 provided on an inner surface 72 of the endless track 70. It is contemplated that in some embodiments, there could be only one set of recesses 56.

The track system 50 has a frame 90. The frame 90 includes a leading frame arm 92, a trailing frame arm 94 and a frame member 96. The leading and trailing frame arms 92, 94 are jointly connected around the driving axle of the vehicle 40, the joint connection being positioned laterally outwardly from the sprocket wheel assembly 54. The leading frame arm 92 extends from the driving axle, in the forward and downward directions, and connects to a forward portion of the frame member 96. The trailing frame arm 94 extends from the driving axle, in the rearward and downward directions, and connects to a rearward portion of the frame member 96. The frame member 96 is positioned below the leading and trailing frame arms 92, 94, and extends parallel to the forward direction of travel of the vehicle.

Still referring to FIG. 1, the track system 50 has a leading idler linkage 100 connected to the forward portion of the frame member 96. It is contemplated that in some embodiments, the leading idler linkage 100 could be integrated to the frame member 96. It is also contemplated that in some embodiments, the leading idler linkage 100 could be omitted. The leading idler linkage 100 has a leading idler wheel assembly 102 rotatably connected thereto. The leading idler wheel assembly 102 includes left and right idler wheels 104a (FIG. 2), and 104b (FIG. 1).

The track system 50 also has a trailing idler linkage 110 connected to the rearward portion of the frame member 96. It is contemplated that in some embodiments, the trailing idler linkage 110 could be integrated to the frame member 96. It is also contemplated that in some embodiments, the trailing idler linkage 110 could be omitted. The trailing idler linkage 110 has a trailing idler wheel assembly 112 rotatably connected thereto. The trailing idler wheel assembly 112 includes left and right idler wheels 114a (FIG. 2), and 114b (FIG. 1).

Referring to FIG. 2, the track system 50 further has a tensioner assembly 118 connected to the trailing idler wheel assembly 112 and operable to adjust the tension in the endless track 70 by selectively moving the trailing idler wheel assembly 112 forward or backward. The tensioner assembly 118 could be connected to the leading idler wheel assembly 102 in another embodiment.

The track system 50 has four support structures 200 connected to the frame member 96. The support structures 200 are disposed longitudinally between the leading and trailing idler wheel assemblies 102, 112. The track system 50 has four support wheel assemblies 202. Each one of the four support wheel assemblies 202 is rotatably connected to one of the support structures 200. The support wheel assemblies 202 each include an outer support wheel 204 and an inner support wheel 206. The support structures 200 will be described in greater detail below.

In this embodiment, track system 50 also has the endless track 70 that extends around components of the track system 50, including the frame 90, the support structures 200, the leading and trailing idler wheel assemblies 102, 112, the support wheel assemblies 202. The endless track 70 has the inner surface 72 and an outer surface 74. The inner surface 72 of endless track 70 has the left and right sets of lugs 76. The left and right set of lugs 76 are adapted to be received within the recesses 56 of the sprocket wheel assembly 54. It is contemplated that in some embodiments, there could be only one set of lugs 76. The outer surface 74 of the endless track 70 has a tread defined thereon. It is contemplated that the tread could vary from one embodiment to another. In some embodiments, the tread could depend on the type of vehicle 40 on which the track system 50 is to be used and/or the type of ground surface on which the vehicle 40 is destined to travel. In the present embodiment, the endless track 70 is an endless polymeric track. It is contemplated that in some embodiments, the endless track 70 could be constructed of a wide variety of materials and structures including metallic components known in track systems 50.

Support Structure

The track system 50 comprises one or more support structure, each of which is used to mount a corresponding support wheel assembly 202 including an axle 210 and at least one support wheel 204 to the frame 90. Several examples of the support structure will now be described. Any one of the various embodiments of the support structure may be mounted to the frame 90. A particular track system 50 may include more than one support structure type.

A first support structure 200A will now be described with reference to FIGS. 3, 4a, 4b, 4c and 4d. It will be noted that the support structure 200A as illustrated is symmetric along the forward direction of travel of the vehicle 40 (arrow 45) and along an axle 210 of the support wheel assembly 202, the axle 210 extending perpendicularly from the forward direction of travel of the vehicle 40. The support structure 200A could therefore be turned 180 degrees in relation to arrow 45. Implementations in which the support structure 200A is not symmetric are also contemplated. Outlines of the support wheels 204, 206 are shown in FIGS. 4a, 4b, 4c and 4d. In an embodiment, the support wheels 204, 206 can be configured in a tandem assembly.

The support structure 200A comprises a plate 220A used to connect the support structure 200A to the frame 90, the axle 210, a resilient member 230A and two collars 240 and 242 disposed along a length of the plate 220A. The axle 210 is shown in an initial position (resting, non-biased) relative to the plate 220A. The resilient member 230A may, for example and without limitation, be made of rubber. In a non-limiting embodiment, the resilient member 230A has a generally triangular cross-section defined in parallel to the axle 210. A length of the resilient member 230A perpendicular to the axle 210 extends over at least over a major portion of a length of the plate 220A.

The resilient member 230A comprises a first surface 232A consistent with a generally flat surface defined by its generally triangular cross-section. The first surface 232A is fixedly connected to the plate 220A and a second surface 232B (inside of an aperture 234A), the second surface 232B being fixedly connected to the axle 210. The second surface 232B of the resilient member 230A may be glued to the axle 210. The resilient member 230A may also be over-molded on the axle 210. An interference fit (press-fit) may be used to maintain the middle portion of the axle 210 in contact with the second surface defined within the aperture 234A of the resilient member 230A.

As illustrated, the axle 210 has, in its middle portion, a sleeve 212 fixedly connected to the resilient member 230 and at least one support wheel attachment portion 214 (two are shown) outside of the middle portion. The sleeve 212 may be fixedly connected to the middle portion of the axle 210, for example by defining grooves, knurls and/or projecting members on the middle portion of the axle 210. Alternatively, the sleeve 212 may be glued or welded to the middle portion of the axle 210. In some embodiments, the sleeve 212 and the axle 210 are unitary.

As illustrated, the collar 240 is positioned in front of the axle 210 along the direction of travel of the vehicle 40; the collar 240 is thus a leading collar and, conversely, the collar 242 is a trailing collar. The support structure 200A can be assembled using a set of bolts 244 and a set of nuts 246 for attaching the plate 220A to frame 90 (FIG. 1) while holding the resilient member 230A between the plate 220A and the collars 240 and 242 positioned on a third surface 236A of the resilient member 230A, which is a curved surface of its generally triangular cross-section. It is understood that in some embodiments, the plate 220A may be integrated in the frame 90, being therefore a part of the frame 90. In an embodiment, a pre-determined compression preload may be applied on the resilient member 230A by attachment of the plate 220A and the collars 240 and 242 using the sets of bolts 244 and the set of nuts 246. In the same or another embodiment, sufficient pressure may be applied between the plate 220A and the collars 240 and 242 so that the resilient member 230A is fixedly maintained between the plate 220A, in contact with the first surface 232A, and the collars 240 and 242, on the third surface 236A of the resilient member 230A. Owing to the pressure applied to the resilient member 230A by the plate 220A and the collars 240 and 242, using glue or other manners of fixedly connecting the various components of the support structure 200A may not be necessary, but could be contemplated in some embodiments.

The support structure 200A allows the axle 210 to move about at least one degree of freedom when, for example, a force is applied on a support wheel 204 by a bump or a depression on the road. The axle 210 may for example pivot about the longitudinal axis of the track system 50 (a roll axis) when a connected support wheel 204 moves up or down, in a vertical plane perpendicular 52 to the longitudinal axis of the track system 50. The axle 210 may also move in other directions, for example about a pitch axis or a yaw axis of the track system 50, in some embodiments. The axle 210 may also move by translation in the vertical plane, along the longitudinal axis of the track system 50, or perpendicularly from the longitudinal axis of the track system 50. These movements of the axle 210 away from its initial position relative to the plate 220A cause a resilient deformation of the resilient member 230A. In turn, the resilient member 230A biases the axle 210 to return to its initial position.

As illustrated, the plate 220A comprises stoppers 222A and 224A on its sides. Should the axle 210 rotate about the longitudinal axis of the track system 50 (indicated by the arrow 45), the axle 210 will eventually abut on one of the stoppers 222A or 224A to limit its rotation. In an embodiment, the support structure 200A allows the axle 210 to rotate about the longitudinal axis within a range of motion of between about −15 and about +15 degrees relative to the initial position. In another embodiment, the support structure 200A allows the axle 210 to rotate about the longitudinal axis within a range of motion of between about −10 and about +10 degrees relative to the initial position.

Referring now to FIGS. 5, 6a, 6b, 6c and 6d, a second support structure 200B will now be described. The support structure 200B includes several of the same components as the support structure 200A, including the collars 240 and 242 positioned on a surface 236B or a resilient member 230B, and is operable to support most of the same functions. The description of the support structure 200B will emphasize its distinctions from the support structure 200A.

The support structure 200B as illustrated is also symmetric a along the forward direction of travel of the vehicle 40 (arrow 45) and along the axle 210. The support structure 200B could therefore be turned 180 degrees in relation to arrow 45. Implementations in which the support structure 200B is not symmetric are also contemplated.

The support structure 200B comprises a plate 220B that includes a raised portion 226B that extends parallel to the axle 210. The resilient member 230B may optionally include a recess 238B located underneath the raised portion 226B of the plate 220B. The raised portion 226B, by itself or with the receive 238B, forms a clearance space defined above the axle 210, between the plate 220B and the resilient member 230B. The clearance space allows the axle 210 to move, by rotation or by vertical translation, in a limited range toward and away from the plate 220B without substantially compressing the resilient member 230B because of the presence of the recess 238B. Ends 222B and 224B may act as stoppers for limiting the rotation of the axle 210 about the longitudinal axis of the track system 50. Raising these ends 222B and 224B above a level of the raised portion 226B in order to allow a higher degree of rotation of the axle 210 is also contemplated. The support structure 200B can be assembled using a set of bolts 244 and a set of nuts 246 for attaching the plate 220B to frame 90 (FIG. 1) while holding the resilient member 230B between the plate 220B and the collars 240 and 242 positioned on a third surface 236B of the resilient member 230B. It is understood that in some embodiments, the plate 220B may be integrated in the frame 90, being therefore a part of the frame 90.

Figure 7A:
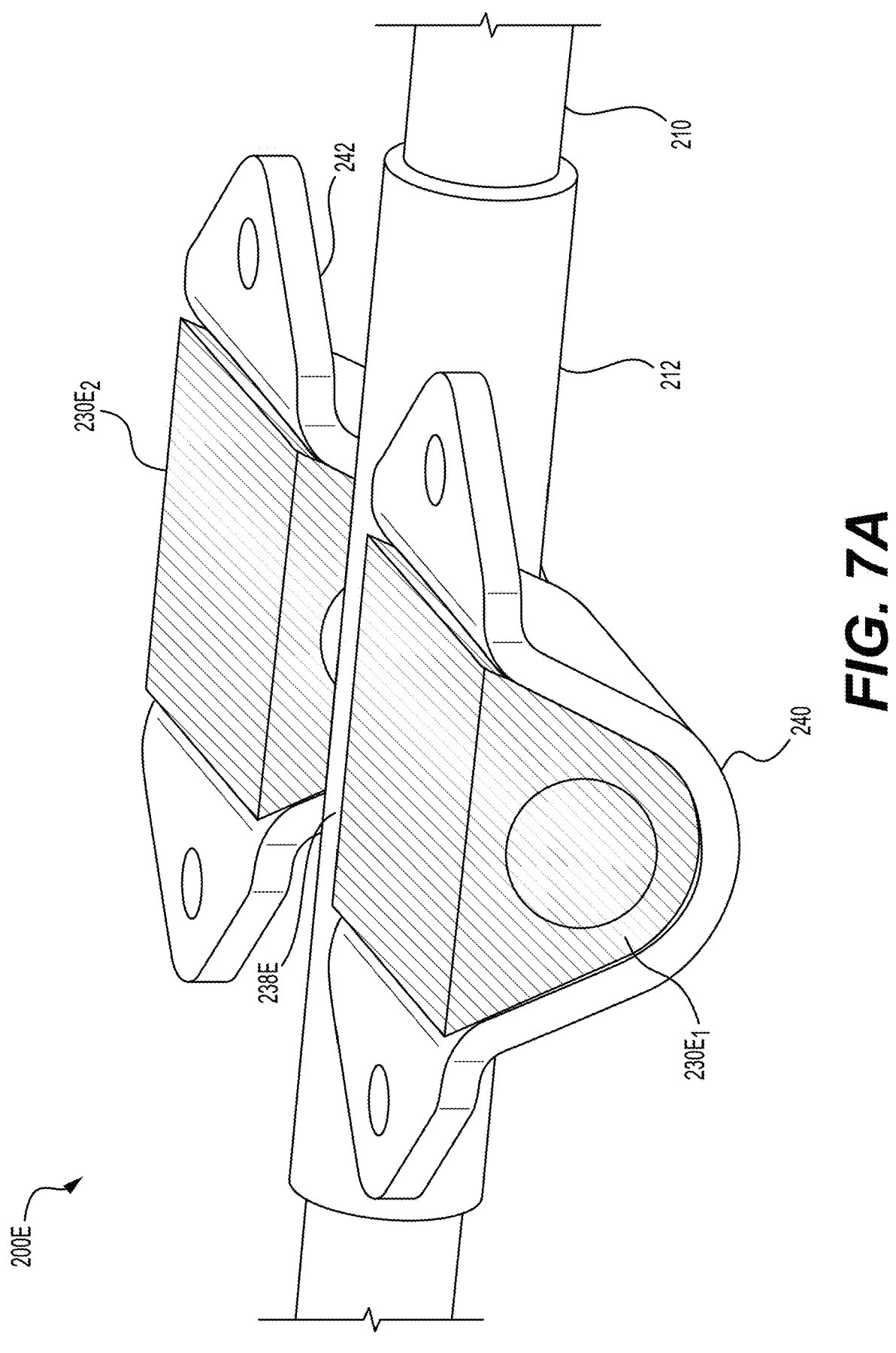
FIG. 7a is a perspective, partial view taken from a top, front, left side of a third support structure in accordance with an embodiment of the present technology.

FIG. 7a describes a third support structure 200E. This embodiment mainly differs from that illustrated in FIGS. 5 and 6a-6d in that the resilient member 230B is replaced by a pair of resilient members 230E$_1$ and 230E$_2$ respectively supported by the two collars 240 and 242. Although not shown on FIG. 7a, the support structure 200E also includes the 220A or the 220B, the set of bolts 244 and the set of nuts 246. A void 238E is left between the resilient members 230E$_1$ and 230E$_2$, in the area where the recess 238B (FIG. 5) of the resilient member 230B is located. Like the recess 238B, the void 238E allows the axle 210 to move, by rotation or by vertical translation, in a limited range toward and away from the plate 220A or 220B without substantially compressing the resilient members 230E$_1$ and 230E$_2$.

Figure 7B:
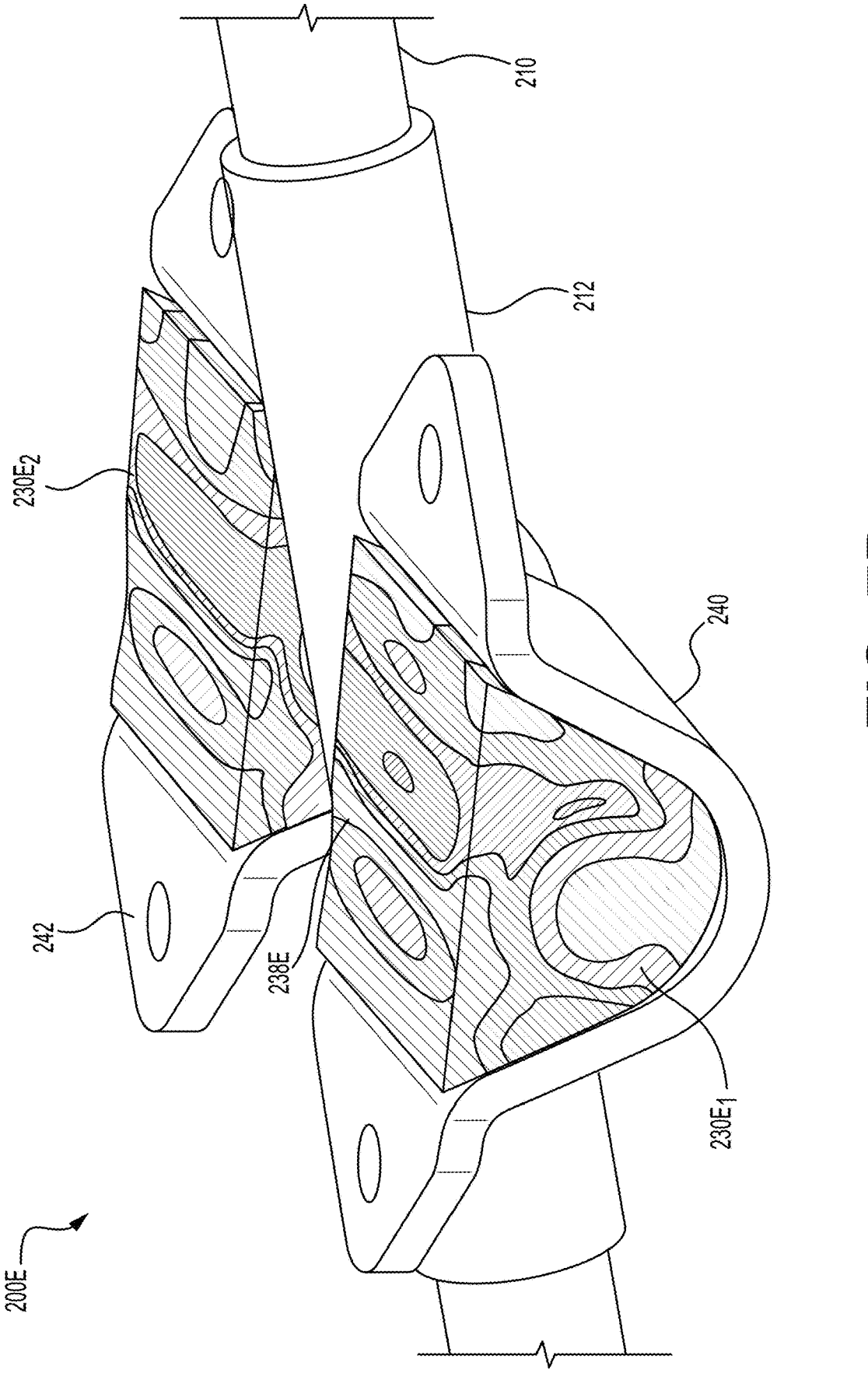
FIG. 7b is a perspective, partial view taken from a top, front, left side of a third support structure of FIG. 7a, in a position resulting from the application of a vertical load on one end of the axle.

FIG. 7b shows how the axle 210 (and the sleeve 212, if present) may move in relation to the support structure 200E when a vertical load is applied on one end of the axle 210.

FIGS. 8, 9a, 9b, 9c and 9d describe a fourth support structure 200C. The support structure 200C comprises a plate 220C used to connect the support structure 200C to the frame 90 (a part of which is shown) of the track system 50 using a bolt 248 and a nut 250, the axle 210, and a resilient member 230C.

It will be noted that the support structure 200C as illustrated is symmetric along the forward direction of travel of the vehicle 40 (arrow 45) and along the axle 210. The support structure 200C could therefore be turned 180 degrees in relation to arrow 45. Implementations in which the support structure 200C is not symmetric are also contemplated. The resilient member 230C is deformable in tension, compression, shear and any combination thereof, allowing movement of the axle 210 over many degrees of freedom. As shown, a first surface 232C of the resilient member 230C is on a first plane thereof and second surface 234C of the resilient member 230C is on a second plane perpendicular to the first plane. A third surface 236C opposite from the first surface 232C is concave and is connected to an arced plate 240C, which is connected to the axle 210, either directly or via the sleeve 212. For example and without limitation, the plate 240C may be welded to the axle 210 and/or to the sleeve 212, or the plate 240C and the sleeve 212 and/or the axle 210 may be cast as a unitary piece.

The plate 220C has undulations extending along its length, in a direction perpendicular to the axle 210. These undulations are shared by the first surface 232C of the resilient member 230C and provide a strong interlock between the plate 220C and the resilient member 230C. In the support structure 200C, the resilient member 230C is not maintained in place by use of collars 240, 242, bolts 244 and nuts 246, as in the embodiments of FIGS. 3 to 7. There is therefore no preload applied on the resilient member 230C. The support structure 200C contains fewer parts that, in turn, facilitates its manufacturing.

In an embodiment, the resilient member 230C may be over-molded over at least one or more of the axle 210, the sleeve 212, the plate 220C, the plate 240C, the nut 250 and the bolt 248 to avoid the formation of gaps between the various components of the support structure 200C and to reduce an eventual number of manufacturing steps of the support structure 200C.

Figure 8:
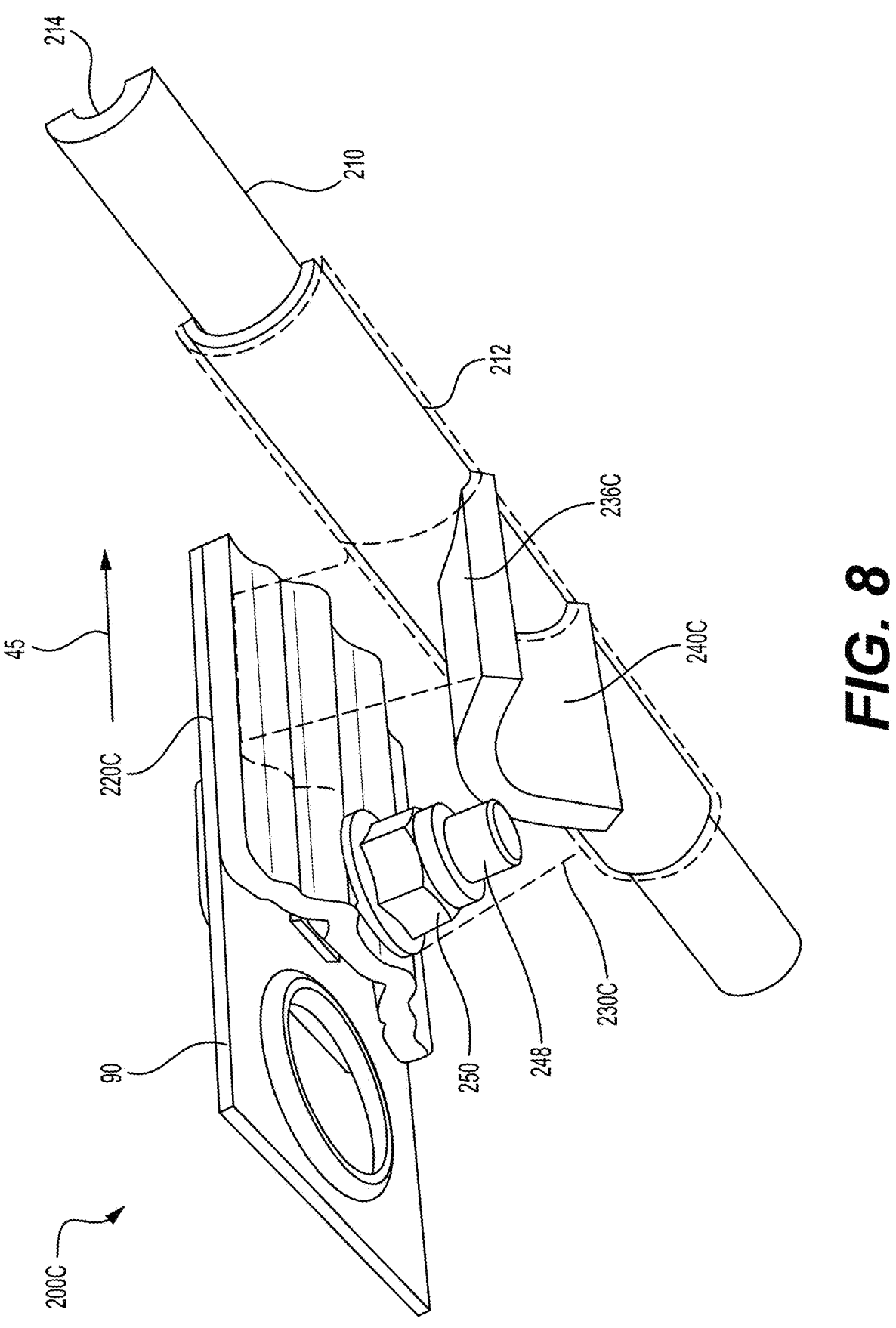
FIG. 8 is a perspective partial view taken from a bottom, rear, right side of a fourth support structure in accordance with an embodiment of the present technology.
Figure 9A:
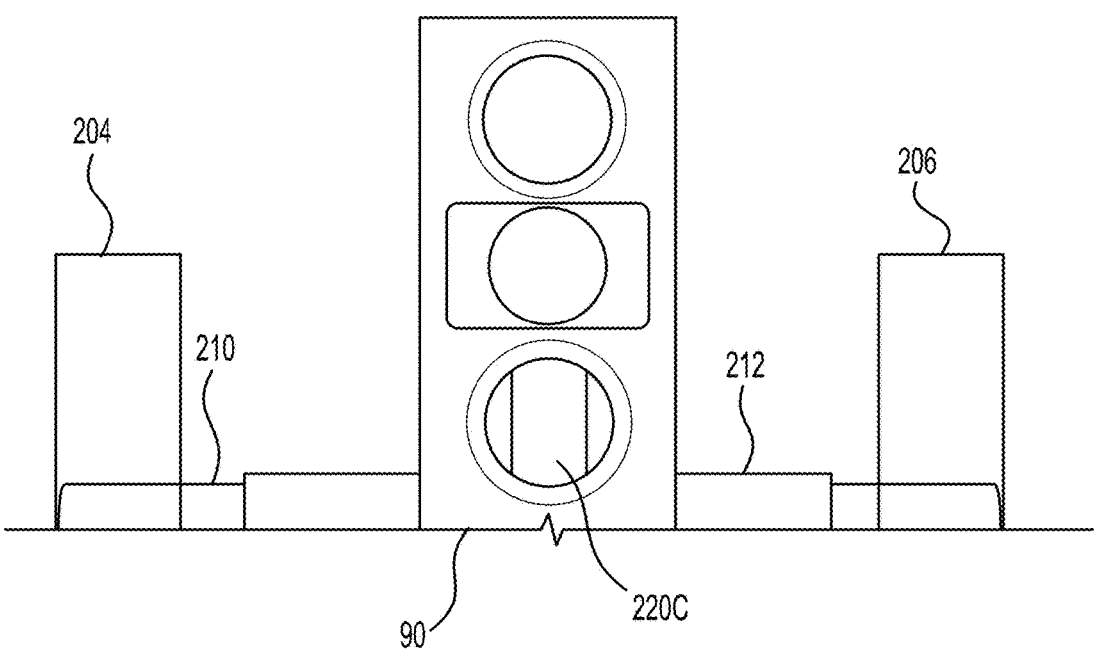
FIGS. 9a, 9b, 9c and 9d are, respectively, top, bottom, front elevation and side elevation partial views of the fourth support structure of FIG. 8.
Figure 9B:
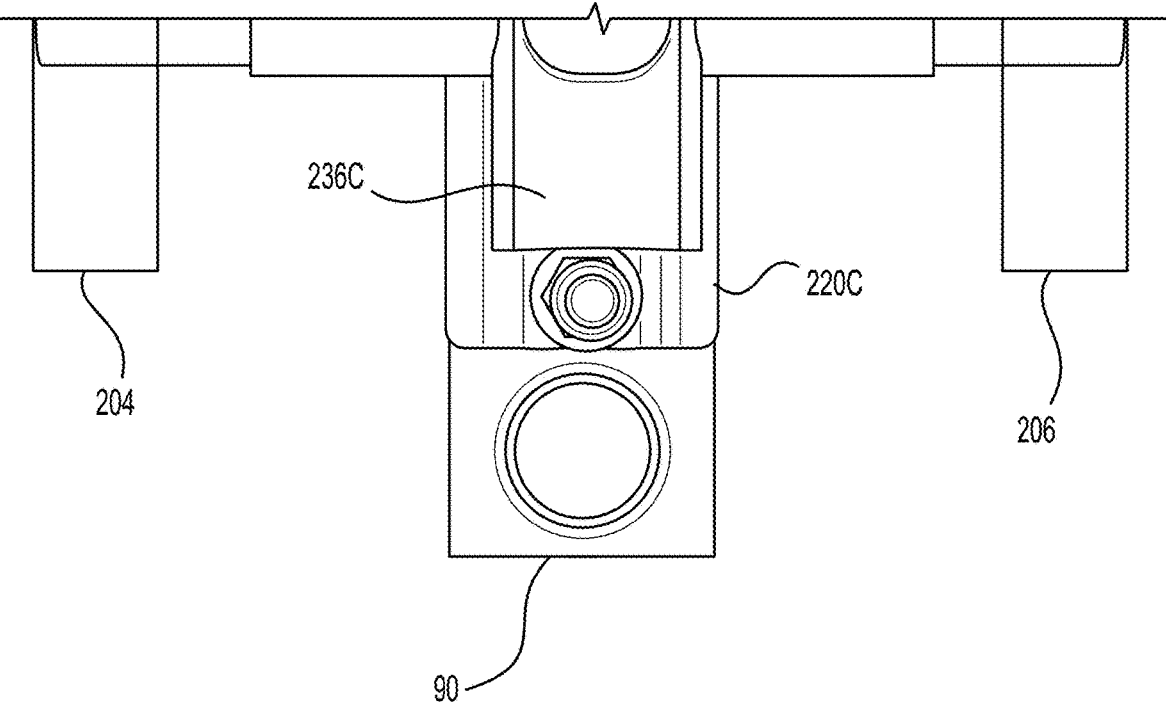
Figure 9C:
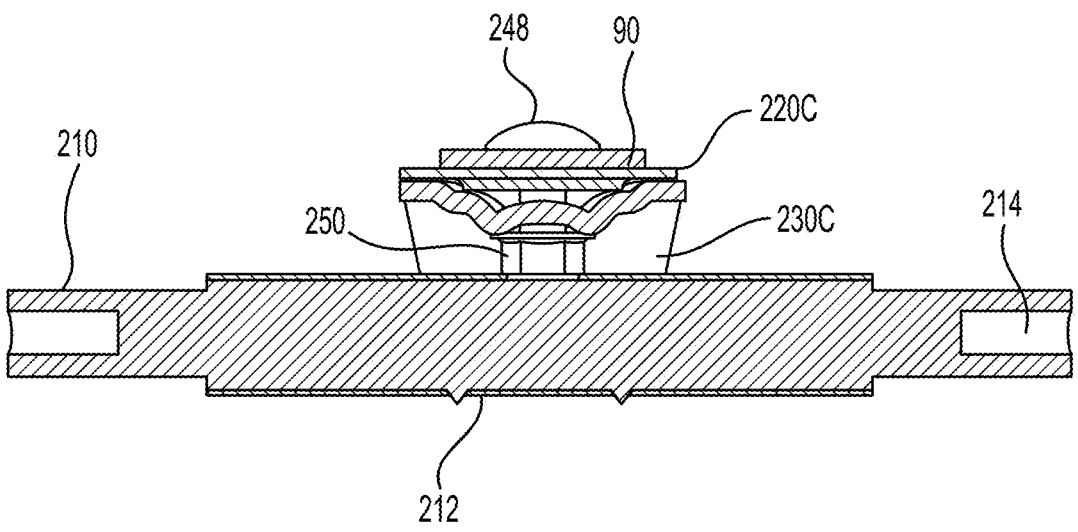
Figure 9D:
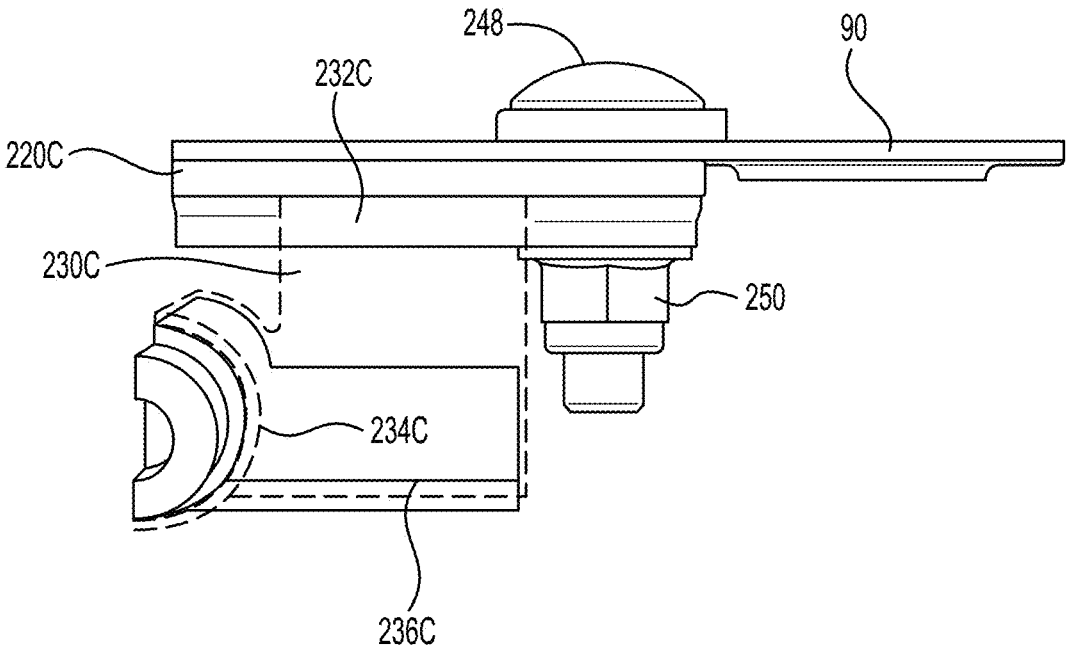
Figures 10A, 10B:
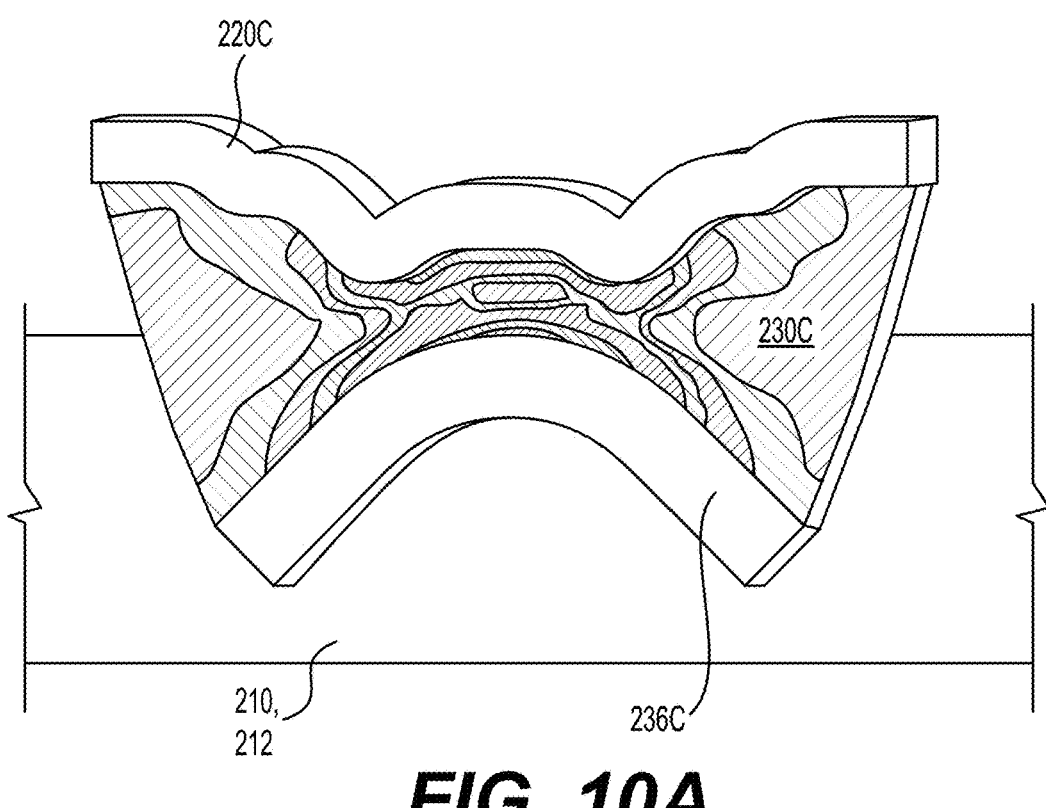
FIGS. 10a and 10b respectively show side elevation partial views of the fourth support structure of FIG. 8 in a resting position and in a position resulting from the application of a vertical load on one end of the axle.
Figure 11:
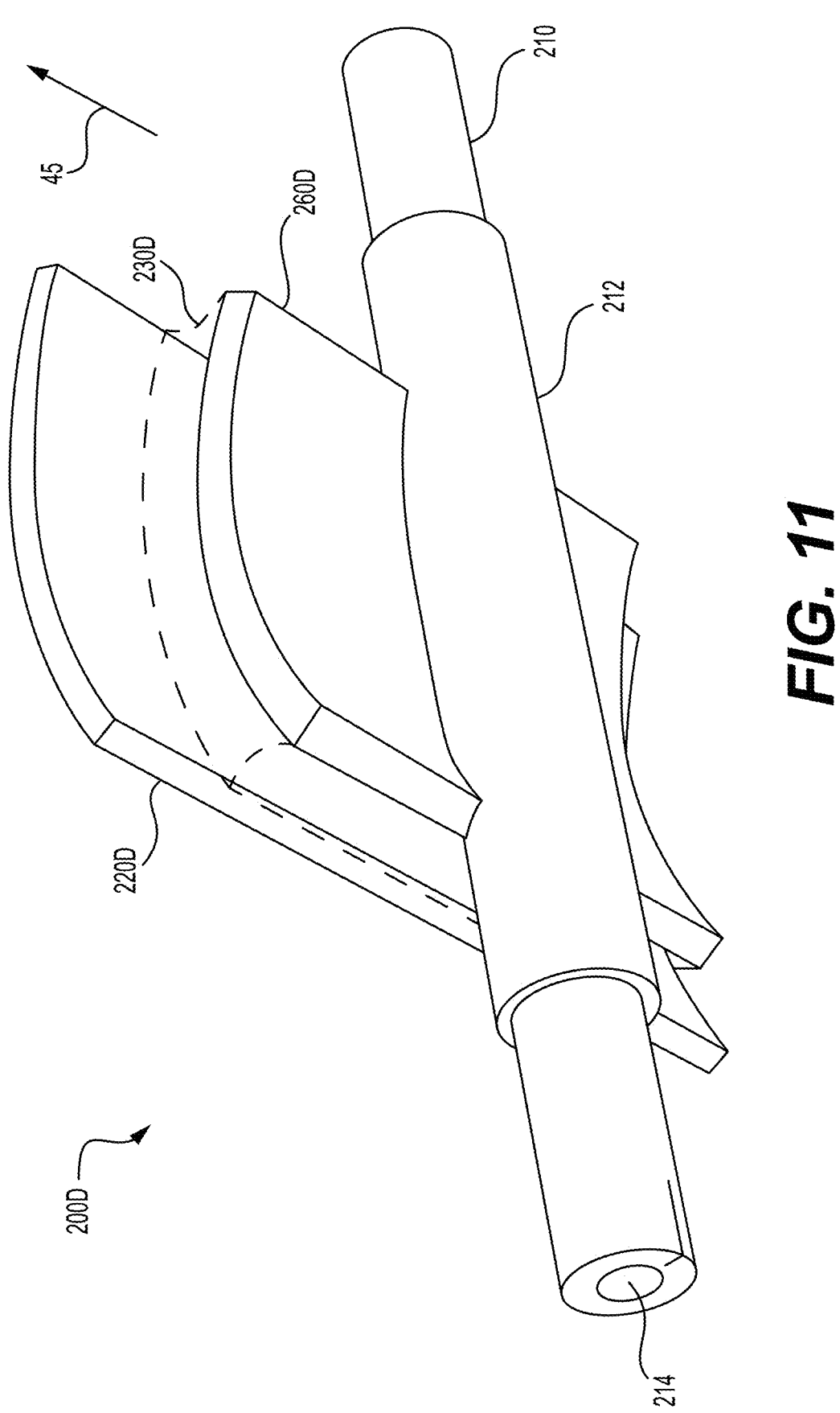
FIG. 11 is a perspective view taken from a bottom, front, right side of a fifth support structure in accordance with an embodiment of the present technology.
Figures 12A, 12B:
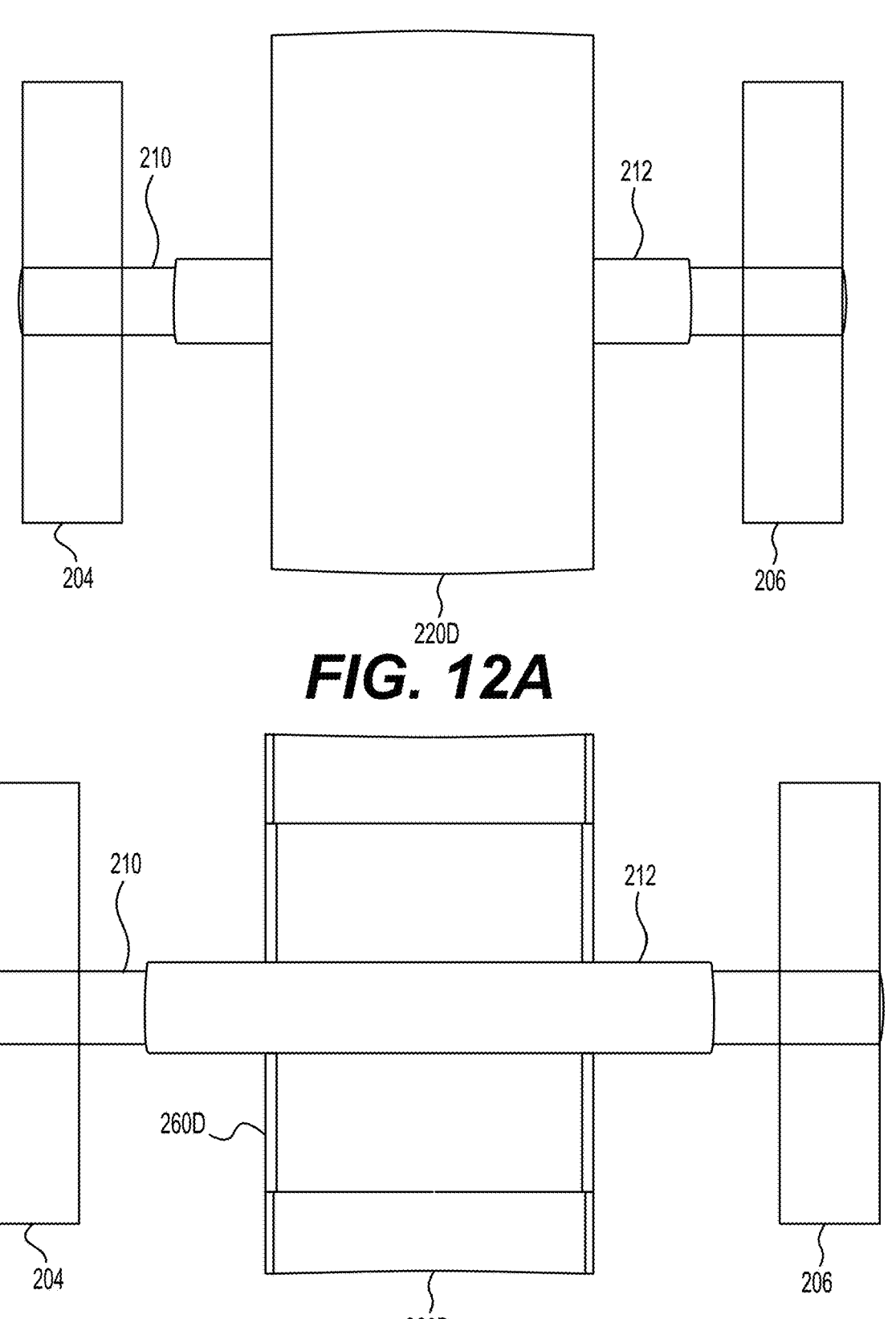
FIGS. 12a, 12b, 12c and 12d are, respectively, top, bottom, front elevation and side elevation views of the fifth support structure of FIG. 11.
Figure 12C:
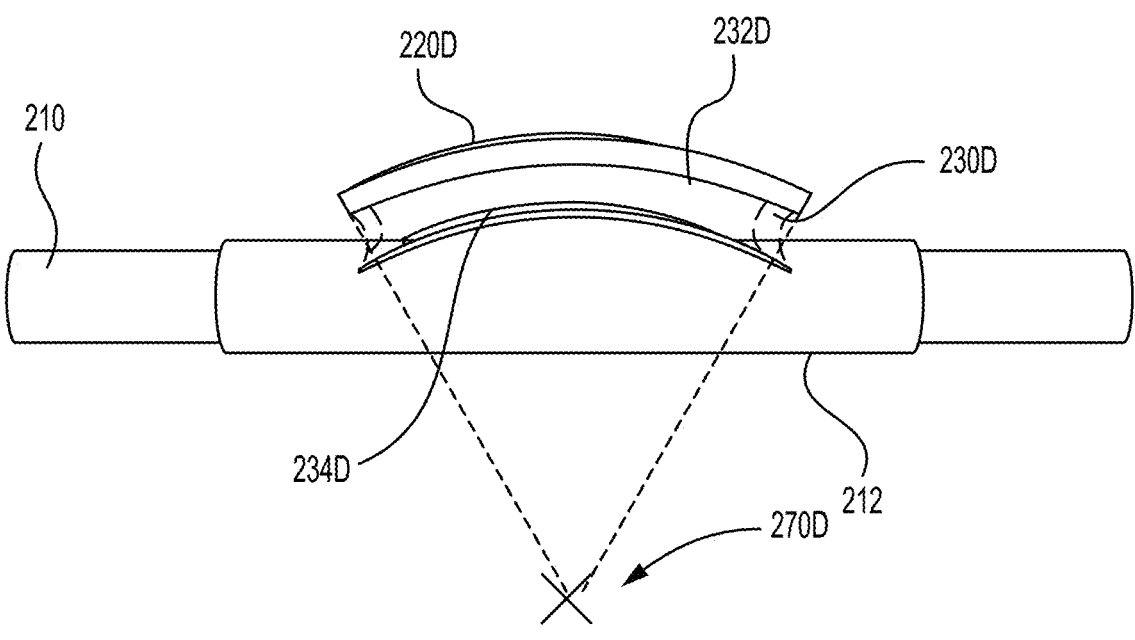
Figure 12D:
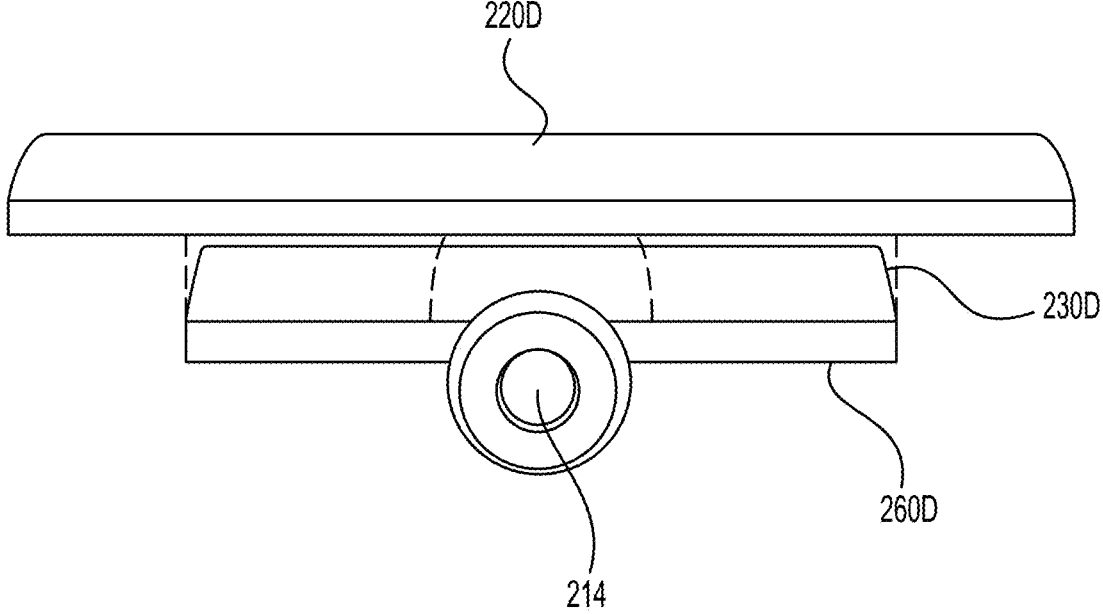

FIGS. 10a and 10b respectively show the fourth support structure of FIG. 8 in a resting position and in a position resulting from a lateral load. FIGS. 10a and 10B show that the arced shape of the plate 240C gives a "butterfly shape" to a cross-section of the resilient member 230C. The resilient member 230C therefore has less material in its central position and more materiel in its lateral extremities, being thinner in a vertical direction in the central position. When the axle 210 (with the sleeve 212, if present) pivots (FIG. 10b) in relation to the plate 220C, which is solidly attached to the frame 90, the "butterfly shape" allows a controlled deformation of the resilient member 230C, compression and expansion of the resilient member 230C taking place mostly on its lateral extremities. When the axle 210 (with the sleeve 212, if present) is in a resting position (FIG. 10a), being parallel to the plate 220C, a load on the resilient member 230C is minimized, as there is no preload applied on the resilient member 230C.

FIGS. 11, 12a, 12b, 12c and 12d describe a fifth support structure 200D. The support structure 200D comprises a top plate 220D used to connect the support structure 200D to the frame 90 of the track system 50 and a bottom plate 260D fixedly connected to the axle 210. It is understood that in some embodiments, the top plate 220D may be integrated in the frame 90, being therefore a part of the frame 90. A resilient member 230D is placed (i.e. sandwiched), in a fixed connection, between the top and bottom plates 220D and 260D. The axle 210 is therefore fixedly connected to the resilient member 230D via the bottom plate 260D.

It will be noted that the support structure 200D as illustrated is symmetric along the forward direction of travel of the vehicle 40 (arrow 45) and along the axle 210. The support structure 200D could therefore be turned 180 degrees in relation to arrow 45. Implementations in which the support structure 200D is not symmetric are also contemplated. The resilient member 230D has a first surface 232D connected to top plate 220D and a second surface 234D connected to the bottom plate 260D. In some cases, the resilient member 230D is glued or over-molded on the first surface 232D and the second surface 234D. In some other cases, the resilient member 230D may be over-molded over at least one or more of the axle 210, the sleeve 212, the plate 220D and the plate 260D to avoid the formation of gaps between the various components of the support structure 200D and to reduce an eventual number of manufacturing steps of the support structure 200D.

As illustrated, the top plate 220D has a first radius of curvature in a plane parallel to the axle 210, and the bottom plate 260D has a second radius of curvature in the same plane. The top and bottom plates 220D and 260D are concentric and share a common center of curvature defining a virtual pivot point 270D in the plane parallel to the axle 210. This virtual pivot point 270D is located away from the support structure 200C so that the axle 210 is positioned between the bottom plate 260D and the virtual pivot point 270D. The curvatures of the top and bottom plates 220D and 260D may for example and without limitation be selected so that the pivot point 270D is positioned at a level of the inner surface 72 of the endless track 70 (FIG. 2). The concentricity of the top and bottom plates 220D and 260D allow the resilient member 230D to deform in the same manner as a circle having a center at the pivot point 270D, underneath the axle 210. In addition, having the axle 210 pivoting about the longitudinal axis of the track system 50 via the virtual pivot 270D allows a minimal lateral displacement of the support wheels 204, 206 relative to the inner surface 72 of the endless track 70, reducing contacts between said support wheels 204, 206 and the lugs 76 projecting from the inner surface 72, which helps preventing premature wear of the endless track 70 and/or support wheels 204, 206, and/or detracking of the track system 50.

Figure 13A:
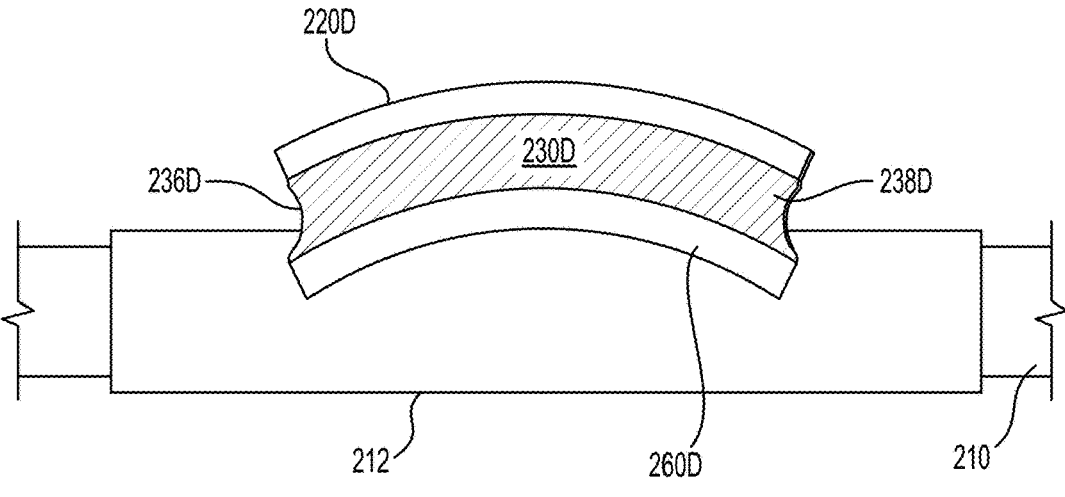
FIGS. 13a, 13b and 13c respectively show side elevation views the fifth support structure of FIG. 11 in a resting position, in nominally loaded position, and in a position resulting from the application of a vertical load on one end of the axle.
Figure 13B:
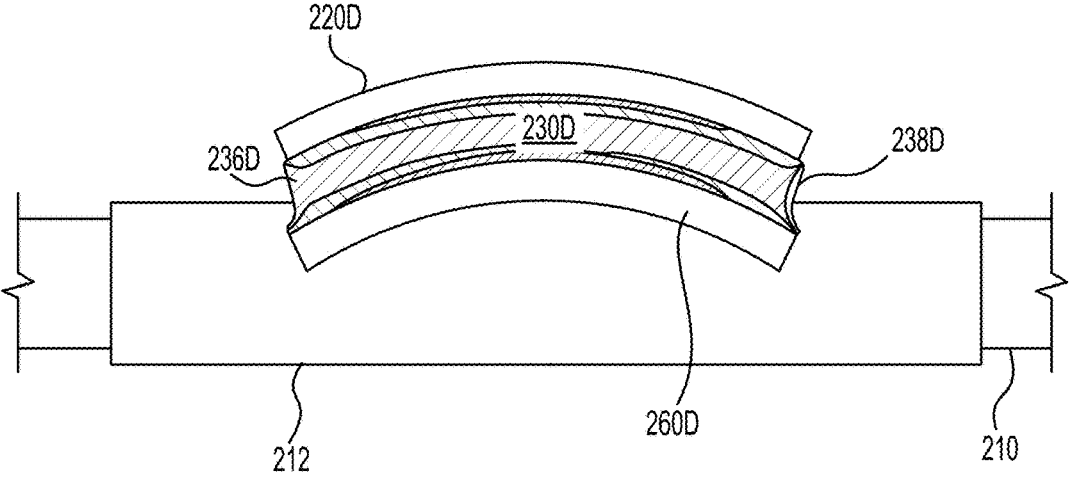
Figure 13C:
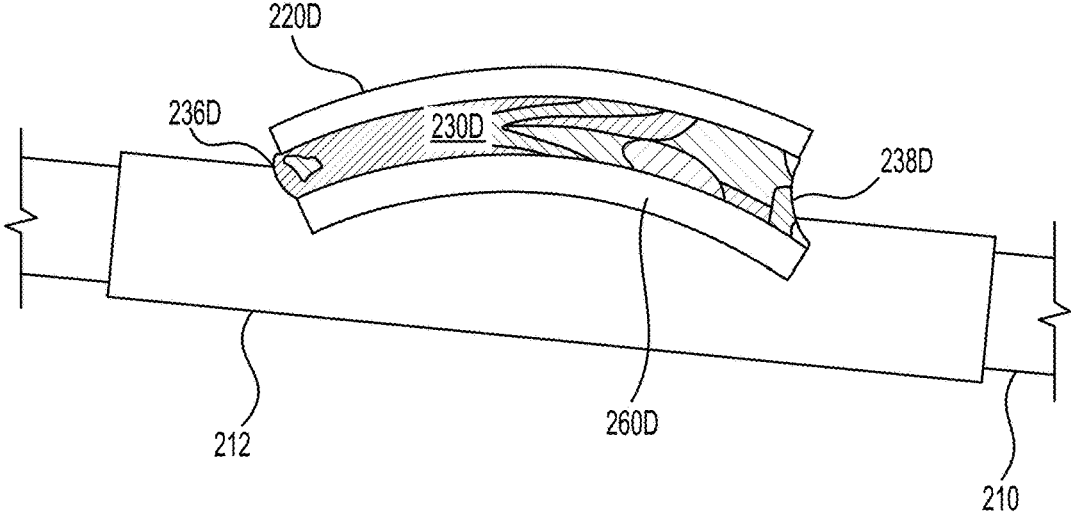

Referring to FIGS. 13a, 13b and 13c, the resilient member 230D defines recesses at its lateral sides 236D and 238D when the axle 210 (and the sleeve 212, if present) is in a resting position (FIG. 13a). The recesses at the lateral sides 236D and 238D define concavities along a length of the support structure 200D defined perpendicularly from the axle 210. The recesses become less deep (or may disappear) when some moderate load, for example a nominal operating load, is evenly applied on the support structure 200D (FIG. 13b), as the resilient member 230D is compressed to some extent. When the axle 210 (and the sleeve 212, if present) pivots about a horizontal axis perpendicular to a length of the axle 210 in relation to the plate 220D, the recess disappears and becomes a bulge at one of the lateral sides that is on a raised side of the axle 210 (at 236D on FIG. 13c); the recess becoming deeper at the other lateral side (238D on FIG. 13c). In an embodiment, the support structure 200D may be positioned in relation to the axle 210 so that the bulge resulting from the pivoting of the axle 210 abuts on the axle 210 (or on the sleeve 212) and effectively provides a soft stopping function limiting a raising movement of the axle 210, to prevent direct contact between the plate 220D and the axle 210 (or the sleeve 212).

Figure 14:
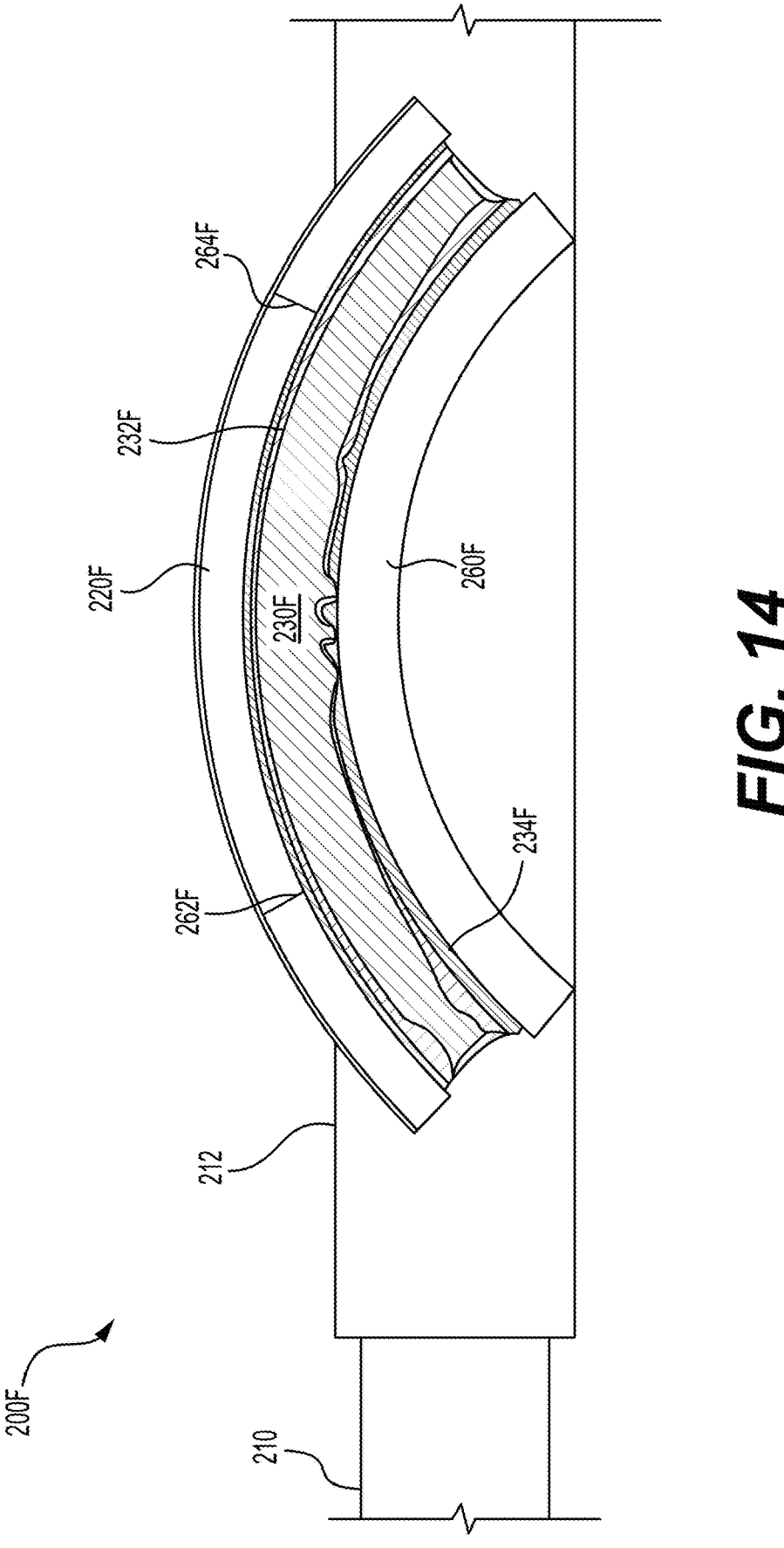
FIG. 14 is a side elevation partial view of a sixth support structure in accordance with an embodiment of the present technology.

Referring to FIG. 14, a sixth support structure 200F is similar to the support structure 200D (FIG. 11), except that its components include lateral indentations 262F and 264F (best seen on FIG. 16a) allowing the support structure 200F to be placed in a lower position and closer to the axle 210 (and to the sleeve 212, if present). The support structure 200F comprises a top plate 220F used to connect the support structure 200F to the frame 90 of the track system 50 and a bottom plate 260F fixedly connected to the axle 210. It is understood that in some embodiments, the top plate 220F may be integrated in the frame 90, being therefore a part of the frame 90. A resilient member 230F is placed (i.e. sandwiched), in a fixed connection, between the top and bottom plates 220F and 260F. The axle 210 is therefore fixedly connected to the resilient member 230F via the bottom plate 260F. In some cases, the resilient member 230F is glued or over-molded on a first surface 232F and a second surface 234F. In some other cases, the resilient member 230F may be over-molded over at least one or more of the axle 210, the sleeve 212, the plate 220F and the plate 260F to avoid the formation of gaps between the various components of the support structure 200F and to reduce an eventual number of manufacturing steps of the support structure 200F.

As in the case of the support structure 200D (FIG. 11), the top plate 220F of the support structure 200F has a first radius of curvature in a plane parallel to the axle 210, and the bottom plate 260F of the support structure 200F has a second radius of curvature in the same plane. The top and bottom plates 220F and 260F are concentric and share a common center of curvature defining a virtual pivot point (not shown, but similar to the virtual pivot point 270D shown on FIG. 12c) in the plane parallel to the axle 210. This virtual pivot point is located away from the support structure 200F. The curvatures of the top and bottom plates 220F and 260F may for example and without limitation be selected so that the pivot point is positioned at a level of the inner surface 72 of the endless track 70 (FIG. 2). The concentricity of the top and bottom plates 220F and 260F allow the resilient member 230F to deform in the same manner as a circle having a center at the pivot point, underneath the axle 210. The effects of having this virtual pivot point defined in the embodiment of FIG. 14 are the same or equivalent to those described hereinabove in relation to the embodiment of FIG. 11.

Figure 15A:
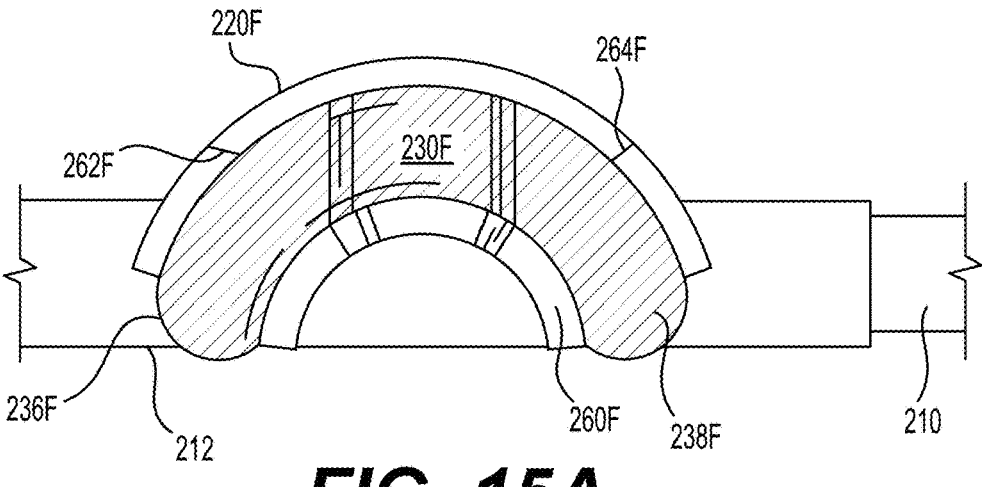
FIGS. 15a, 15b and 15c respectively show side elevation partial views the sixth support structure of FIG. 14 in a resting position, in a nominally loaded position, and in a position resulting from the application of a vertical load on one end of the axle.
Figure 15B:
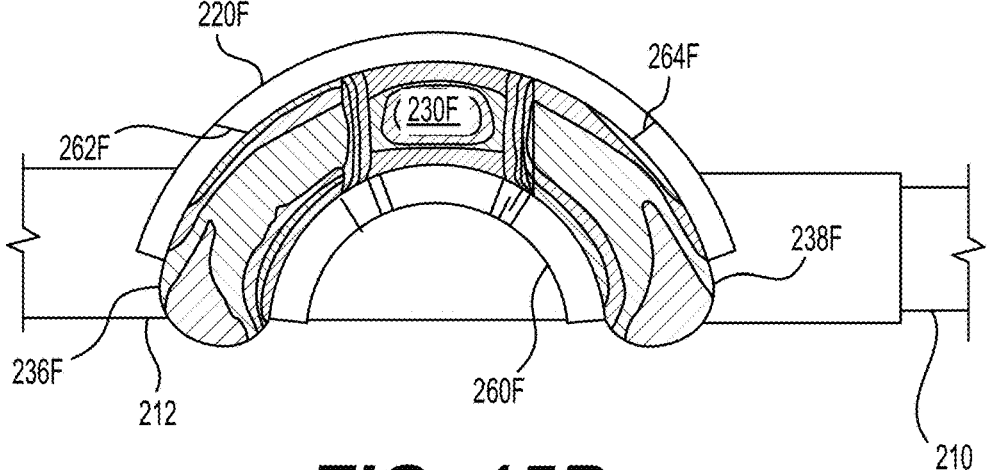
Figure 15C:
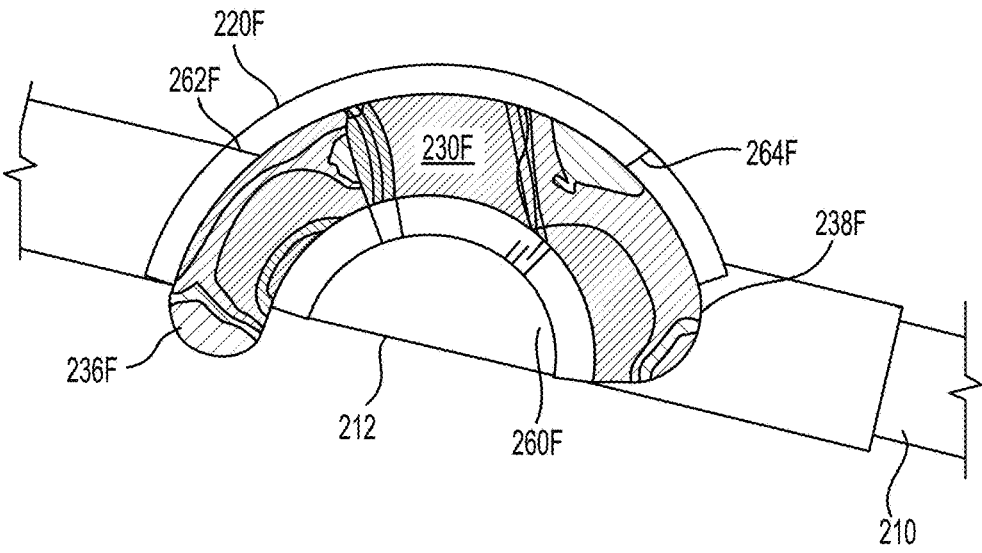

Referring to FIGS. 15a, 15b and 15c, the resilient member 230F may define bulges at its extremities 236F and 238F, whether the axle 210 (and the sleeve 212, if present) is in a resting position (FIG. 15a), when some moderate load, for example a nominal operating load, is evenly applied on the support structure 200F (FIG. 15b), as the resilient member 230F is compressed to some extent, or when the axle 210 (and the sleeve 212, if present) pivots about a horizontal axis perpendicular to a length of the axle 210 in relation to the plate 220F (FIG. 15c) until the axle 210 (or the sleeve 212, if present) abuts on the inside of the lateral indentation 262F or 264F. It may be noted that the bulges may not be present, at least when the axle 210 is in a resting position, as illustrated on FIG. 14.

Figures 16A, 16B:
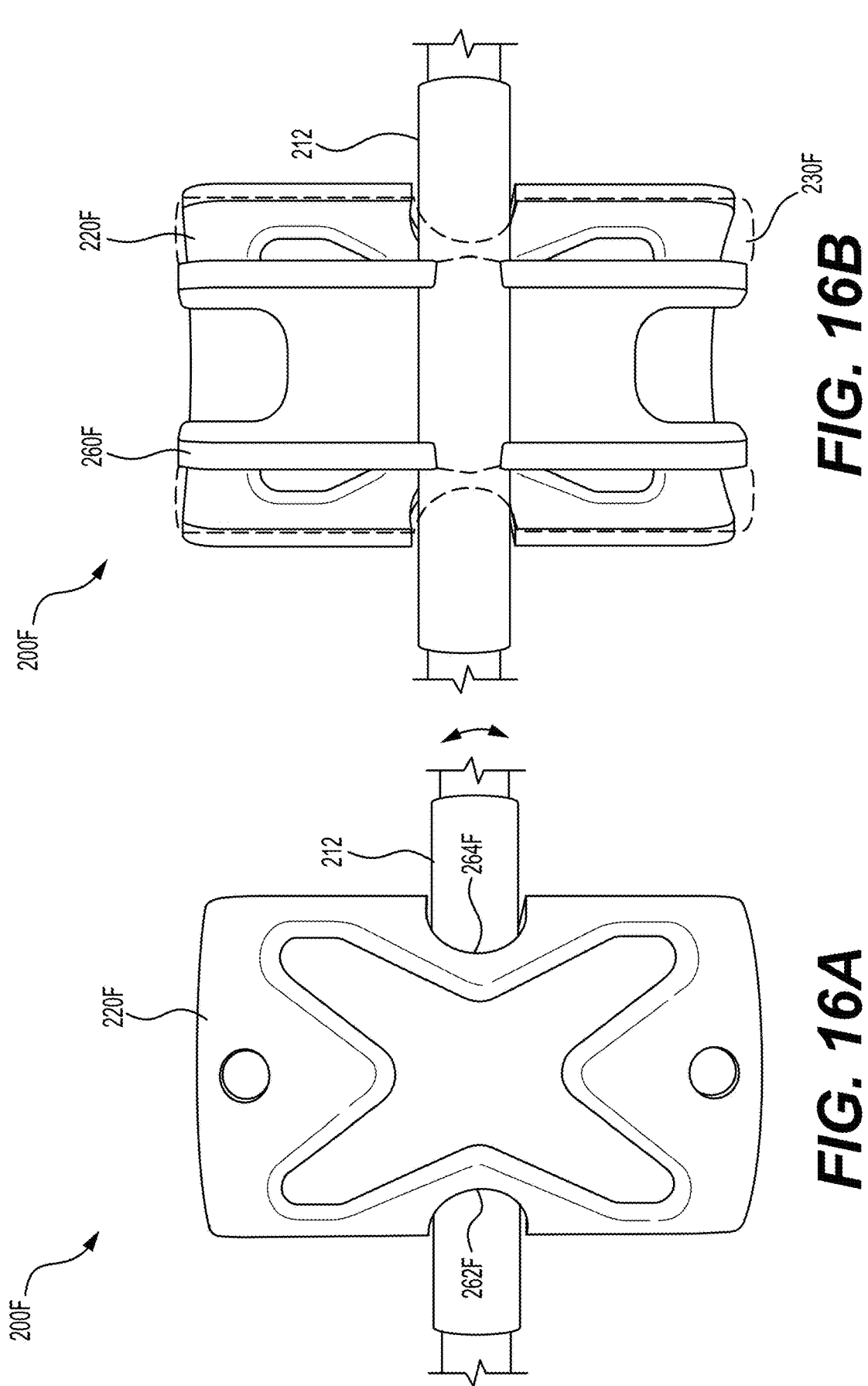
FIG. 16a is a top plan view of the sixth support structure of FIG. 14.
FIG. 16b is a bottom plan view of the sixth support structure of FIG. 14.
Figure 16C:
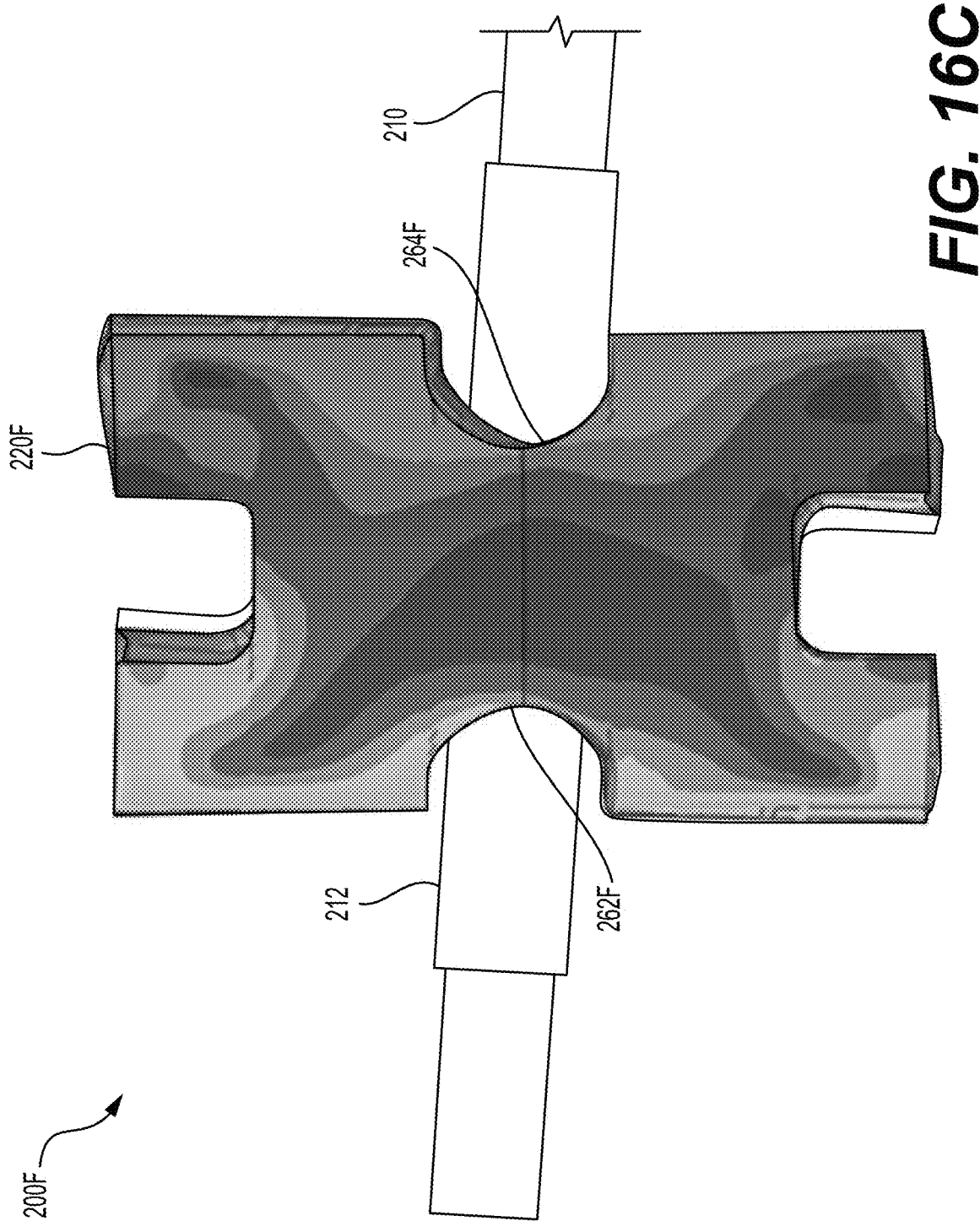
FIG. 16c is a top plan view of the sixth support structure of FIG. 14 showing the effect of a horizontal load on the axle.
Figure 7B:
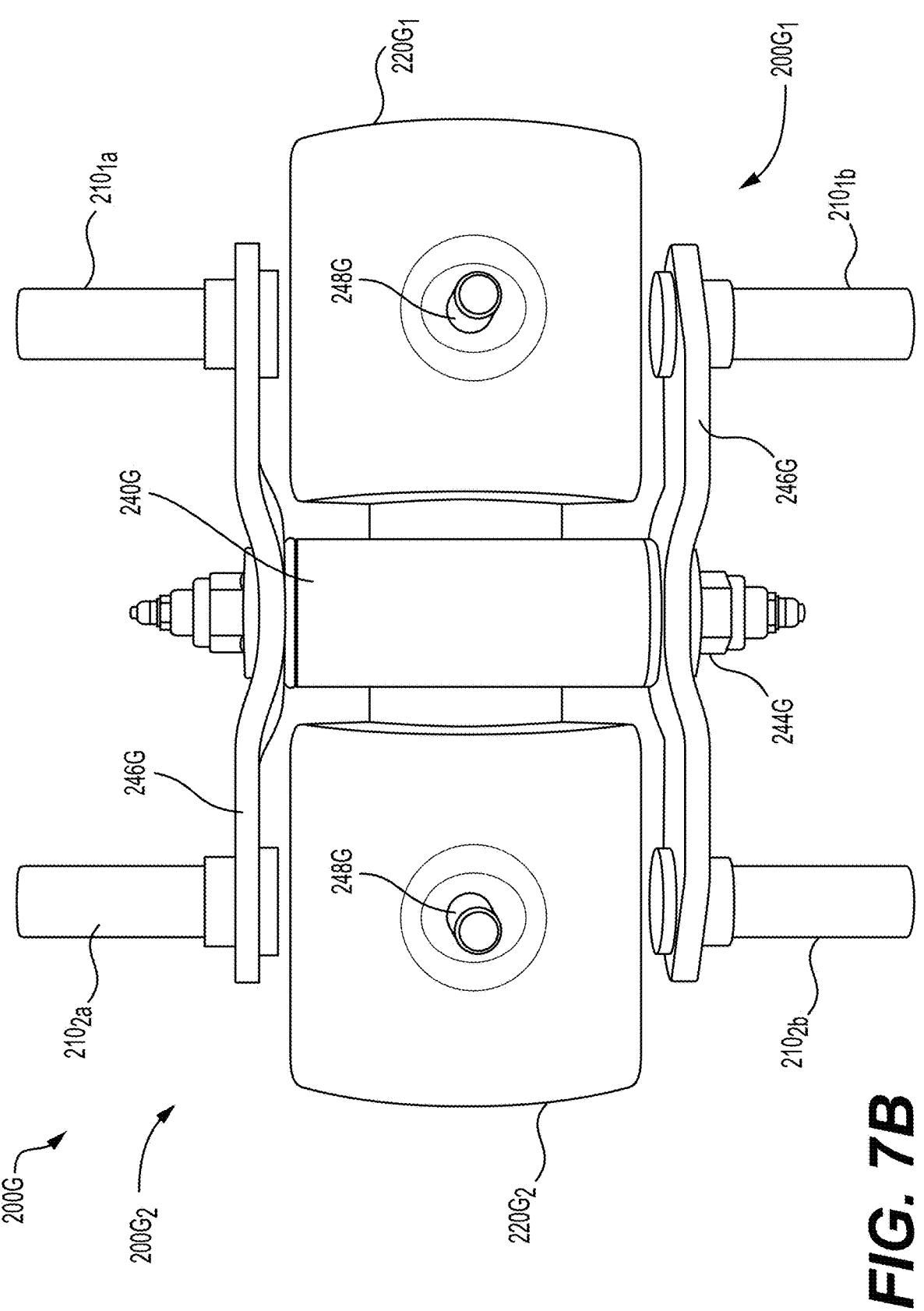

As shown on FIGS. 16a, 16b and 16c, the lateral indentations 262F and 264F of the support structure 200F are aligned with a longitudinal axis of the axle 210 to allow the axle 210 (and the sleeve 212, if present) to rotate about a vertical axis perpendicular to the length of the axle 210 (in a direction indicated by the double arrow on FIG. 16a) when a horizontal load is applied on one end of the axle 210, or when opposite horizontal loads are applied on opposite ends of the axle 210. The effect of the application of the horizontal load is shown on FIG. 16c. It may be observed that the bottom plate 260F of the support structure 200F being fixedly connected to the axle 210 (or to the sleeve 212), it has smaller indentations than those present on the top plate 220F, as indentations on the bottom plate 260F are shaped to conform to the periphery of the axle 210 (or of the sleeve 212). FIGS. 16a and 16b show that apertures may be formed in the top plate 220F allowing to mount the support structure 220F to the frame 90 of the track system 50 by use of nuts and bolts (not shown).

Referring to FIGS. 17a, 17b, 17c, 17d, 17e and 17f, a seventh support structure 200G has a "tandem" configuration connecting two distinct axles, each of which is split into half-axles. In more details, a front axle at a front end $200G_1$ of the support structure 200G comprise half-axles $210_{1a}$ and $210_{1b}$, and a rear axle at a rear end $200G_2$ of the support structure 200G comprises half-axles $210_{2a}$ and $210_{2b}$, these half-axles being respectively located on front left, front right, rear left and rear right corners of the support structure 200G.

The front end $200G_1$ of the support structure 200G comprises a top plate $220G_1$, a bottom plate $260G_1$, and a resilient member $230G_1$ between the top and bottom plates $220G_1$, $260G_1$. The rear end $200G_2$ of the support structure 200G comprises a top plate $220G_2$, a bottom plate $260G_2$, and a resilient member $230G_2$ between the top and bottom plates $220G_2$, $260G_2$. The bottom plates $260G_1$ and $260G_2$ are fixedly connected (for example being welded or cast) to a cylinder-shaped support member 240G. Left and right connecting plates 246G are connected to an internal axle 250G contained in the cylinder-shaped support member 240G, via bolts 244G. The bottom plates $260G_1$ and $260G_2$ may further be joined via a U-shaped brace 242G, by welding or casting. The half-axles $210_{1a}$, $210_{1b}$, $210_{2a}$ and $210_{2b}$ are attached to the left and right connecting plates 246G. The top plates $220G_1$ and $220G_2$ of the support structure 200G may be attached to the frame 90 of the track system 50 using a pair of bolts 248G.

Figure 17A:
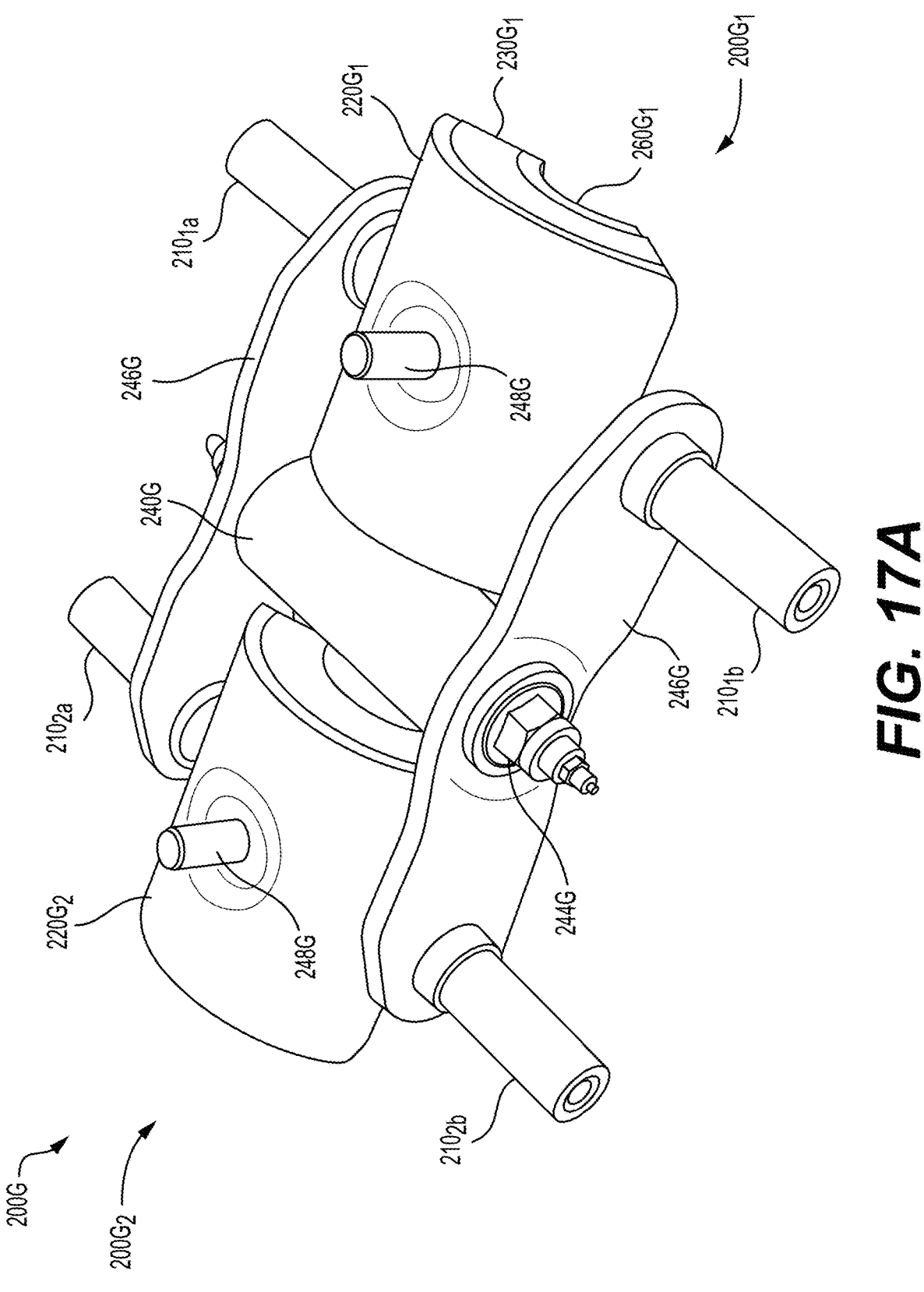
Figure 17C:
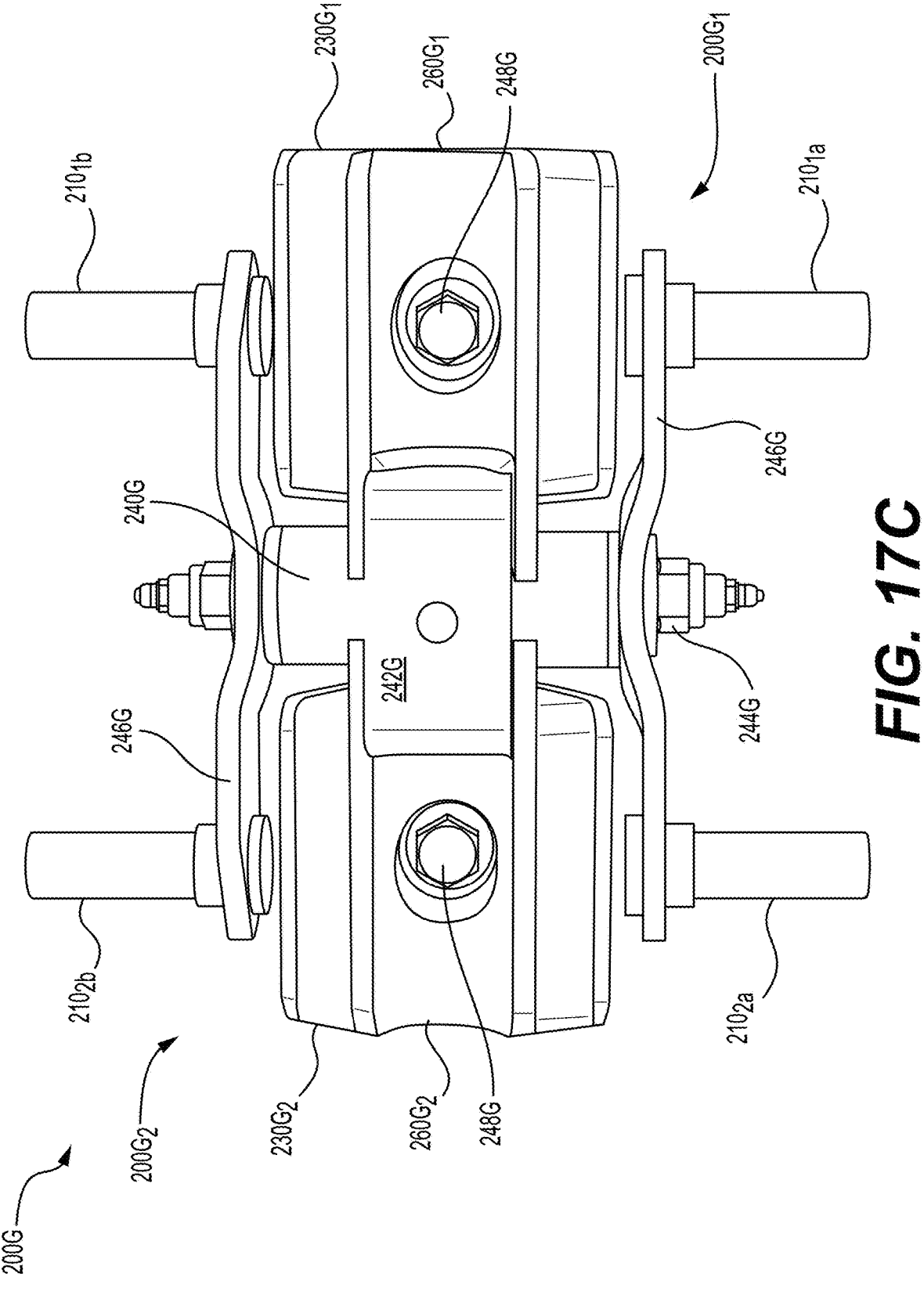
Figure 17D:
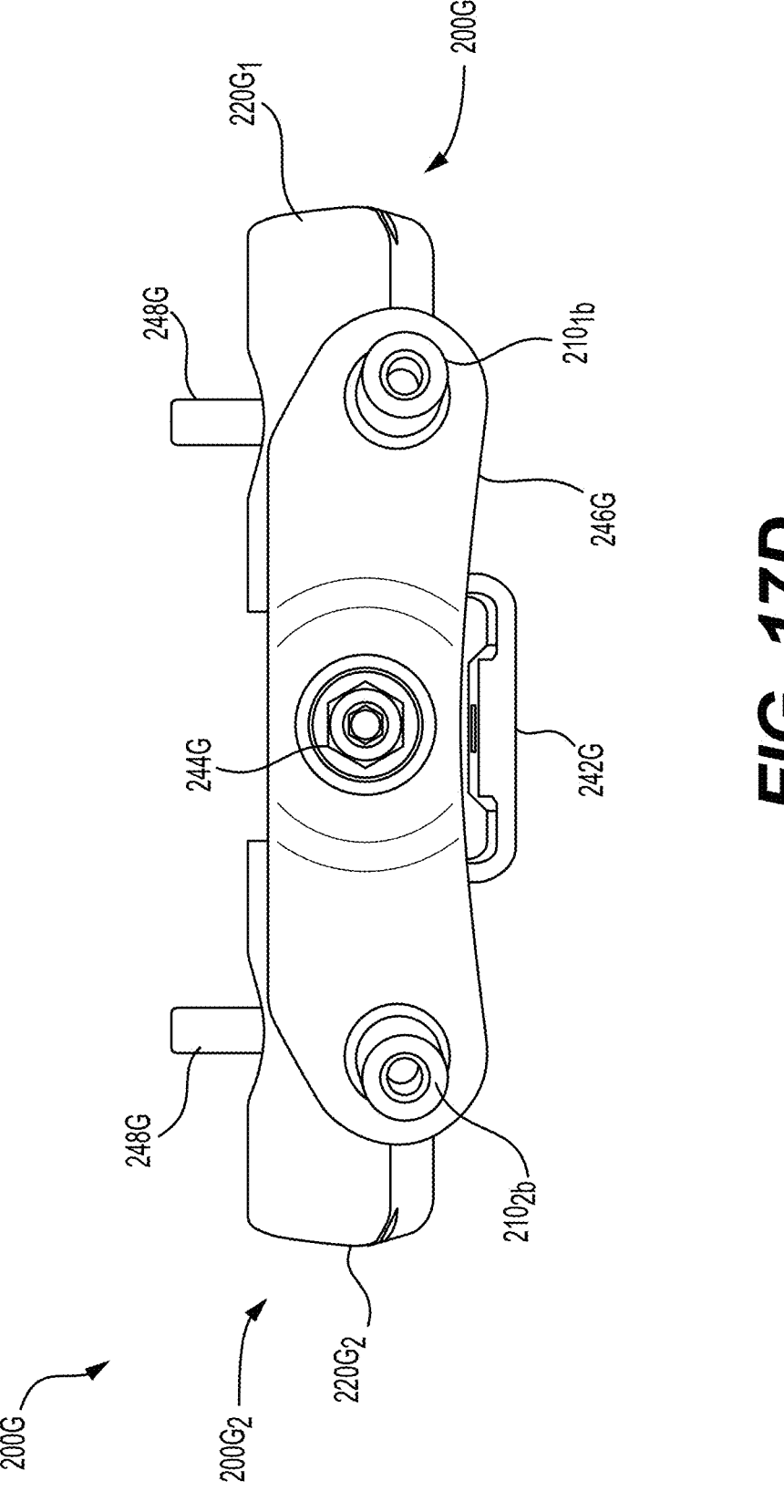
Figure 17E:
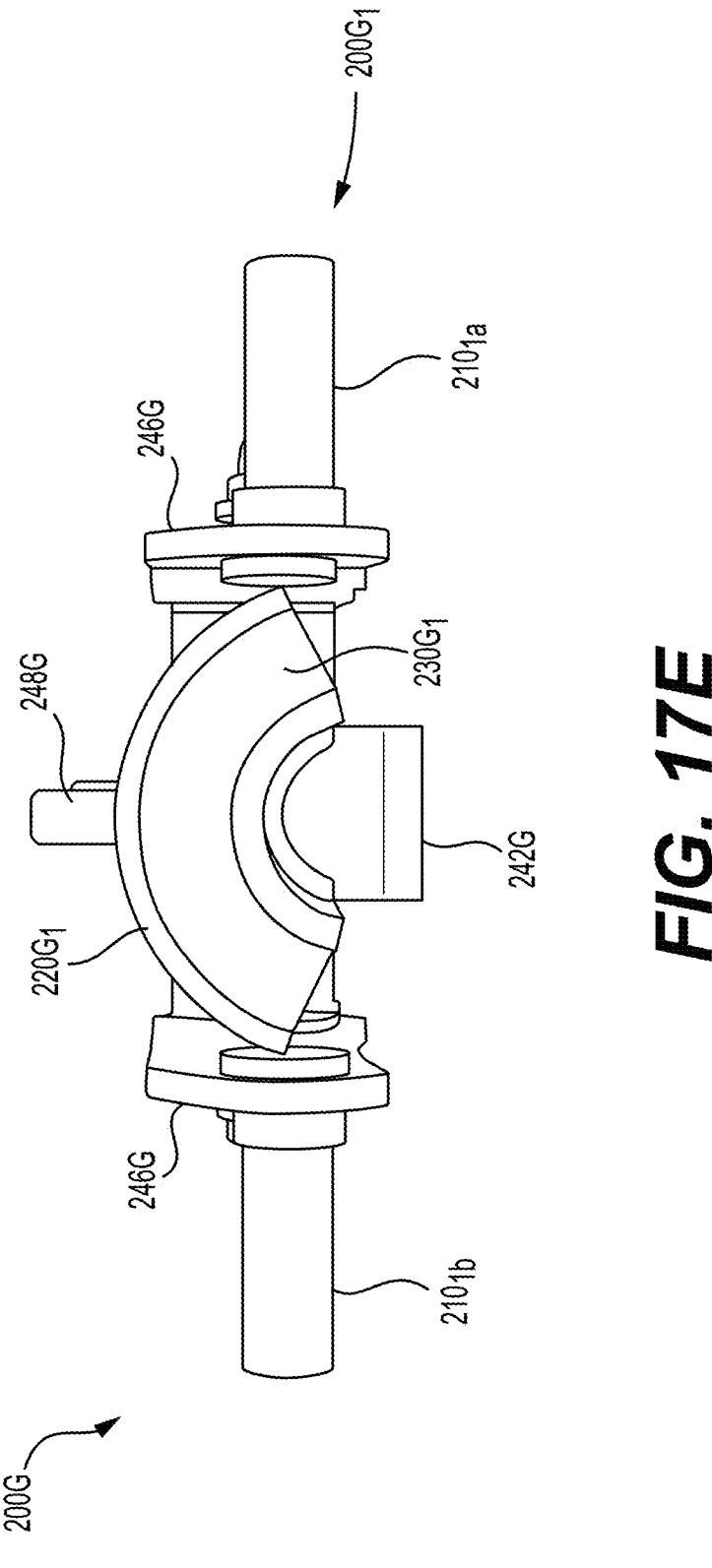
Figure 17F:
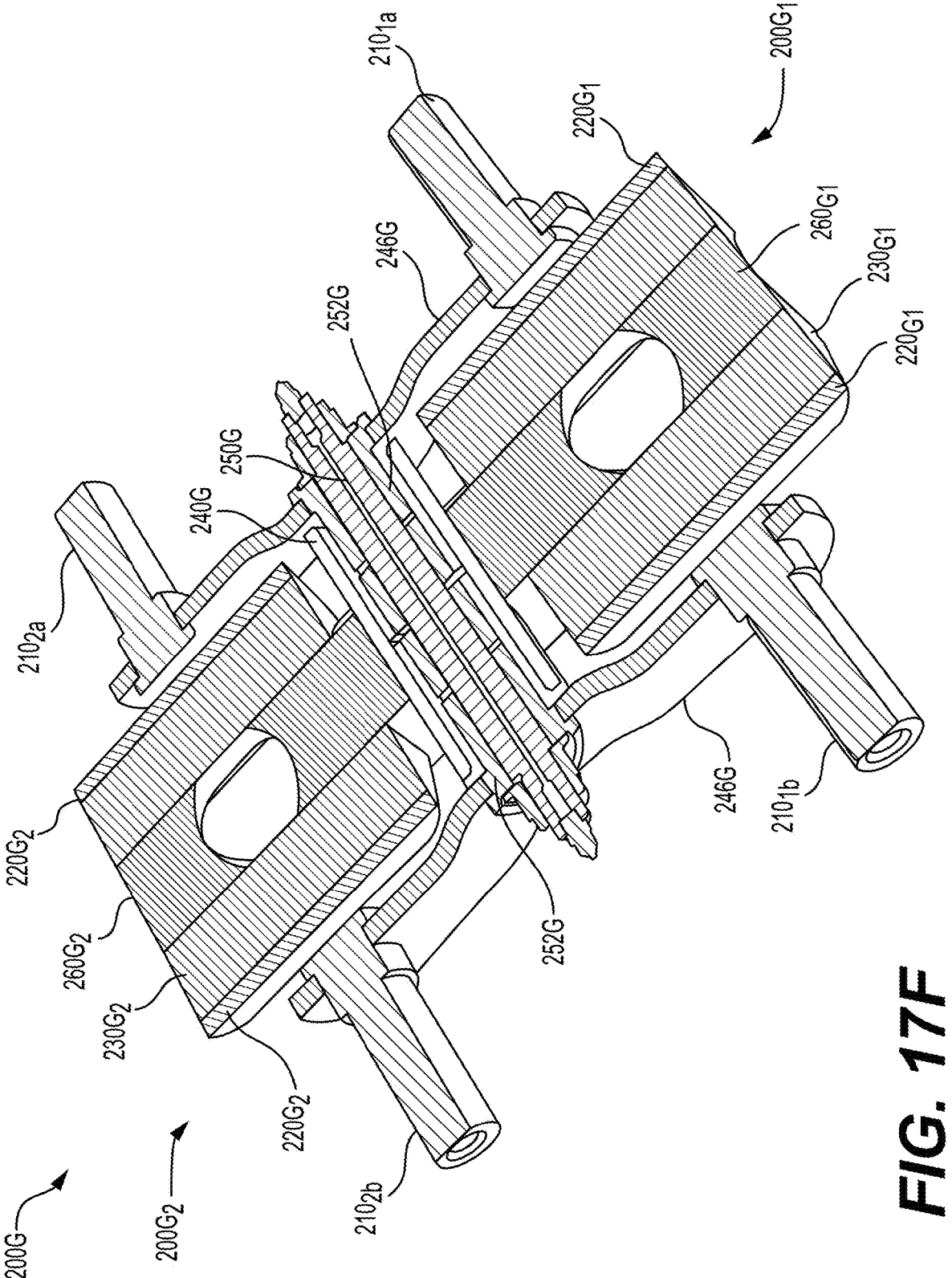

As best seen on the cutaway view of FIG. 17f, the internal axle 250G and two sheaths 252G are contained in the cylinder-shaped support member 240G. Each of the left and right connecting plates 246G is fixedly connected to a respective one of the sheaths 252G, both of which can independently rotate about the internal axle 250G. The respective connections of the connecting plates 246G to the sheaths 252G allow the connecting plates 246G to independently rotate about the axle internal 250G in relation to the cylinder-shaped support member 240G. Hence, the combination of the left connecting plate 246G and of the half-axles $210_{1a}$ and $210_{2a}$ may rotate about the internal axle 250G, thereby pivoting in relation to the cylinder-shaped support member 240G, independently from the combination of the right connecting plate 246G and of the half-axles $210_{1b}$ and $210_{2b}$. Optionally, the left and right connecting plates 246G may be fixedly connected (e.g. by welding) to the internal axle 250G, in which case the combination of the left connecting plate 246G and of the half-axles $210_{1a}$ and $210_{2a}$ and the combination of the right connecting plate 246G and of the half-axles $210_{1b}$ and $210_{2b}$ may pivot together in relation to the cylinder-shaped support member 240G.

Each of the front and rear ends $200G_1$, $200G_2$ of the support structure 200G may react to loads applied on the half-axes $210_{1a}$, $210_{1b}$, $210_{2a}$ and $210_{2b}$ in a manner similar to the support structure 200F (FIG. 14). The support structure 200G however has a different construction that allows for different reactions, as a load applied to any one of the $210_{1a}$, $210_{1b}$, $210_{2a}$ and $210_{2b}$ may cause a compression, extension, or other stress on either one or both of the resilient members $230G_1$ and $230G_2$.

Materials and Manufacturing

The various components of the support structure 200A, 200B, 200C and 200D and the track system 50 are made of conventional materials (e.g. metals and metal alloys in most cases, such as aluminum and/or steel) via conventional manufacturing processes (e.g. casting, molding, turning, machining, etc.). The resilient members are made of rubber or polymeric materials having similar properties. The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A support structure for connecting at least one support wheel assembly to a frame of a track system for a vehicle, the support structure comprising:

at least one plate configured to connect the support structure to the frame;

at least one axle configured for supporting the at least one support wheel assembly; and at least one resilient member having a first surface in direct contact with the at least one plate and fixedly connected thereto, and a second surface in direct contact with the at least one axle and fixedly connected thereto;

the at least one axle being movable in at least one degree of freedom upon resilient deformation of the at least one resilient member; and the at least one axle having an initial position in relation to the at least one plate, the at least one resilient member biasing the at least one axle toward the initial position upon movement of the at least one axle away from the initial position.

2. The support structure of claim 1, wherein:

the track system defines a longitudinal axis parallel to a forward direction of travel of the vehicle;

the at least one axle extends perpendicularly from the longitudinal axis of the track system; and the at least one axle is pivotable about the longitudinal axis of the track system.

3. The support structure of claim 1, wherein the at least one plate comprises, at each opposite end thereof, a stopper configured to limit a pivotal movement of the at least one axle about the longitudinal axis of the track system.

4. The support structure of claim 1, wherein the at least one axle comprises:

a middle portion;

a support wheel attachment portion on at least one side of the middle portion; and at least one sleeve fixedly connected to the at least one resilient member, the at least one sleeve covering the middle portion of the at least one axle.

5. The support structure of claim 1, wherein the at least one resilient member has a generally triangular cross-section defined in parallel to the at least one axle, a length of the at least one resilient member perpendicular to the at least one axle extending at least over a major portion of a length of the plate along a longitudinal axis, a middle portion of the at least one axle being inserted at least in part in an aperture of the at least one resilient member defining the second surface of the at least one resilient member.

6. The support structure of claim 5, wherein the middle portion of the at least one axle is maintained in the aperture of the at least one resilient member by use of an interference fit.

7. The support structure of claim 5, further comprising at least one pair of collars, one collar of each pair being fixedly attached to the at least one plate on each opposite side of the plate so that the at least one resilient member is fixedly maintained between the at least one plate on the first surface and the at least one pair of collars on a third surface.

8. The support structure of claim 7, wherein the at least one pair of collars and the at least one plate impart a pre-determined compression preload on the at least one resilient member.

9. The support structure of claim 5, wherein the at least one plate comprises a raised portion extending parallel to the at least one axle, the raised portion forming a clearance space defined above the at least one axle between the at least one plate and the at least one resilient member, the clearance space allowing the at least one axle to move in a limited range toward and away from the at least one plate without compressing the at least one resilient member.

10. The support structure of claim 1, wherein:

the at least one resilient member is connected to the at least one axle; and the at least one resilient member is deformable in tension, compression, shear and any combination thereof.

11. The support structure of claim 10, further comprising at least one nut and at least one bolt configured for mounting the support structure to the frame of the track system.

12. The support structure of claim 10, wherein the at least one resilient member is over-molded over one or more of the at least one axle, and the at least one plate.

13. The support structure of claim 10, wherein the first surface of the at least one resilient member is on a first plane thereof and the second surface of the at least one resilient member is on a second plane thereof perpendicular to the first plane, the at least one resilient member further comprising a third surface opposite from the first surface, the third surface being concave.

14. The support structure of claim 1, wherein:

the at least one plate is a first plate;

the support structure further comprises at least one second plate;

the first surface of the at least one resilient member is connected to the at least one first plate;

the second surface of the at least one resilient member is connected to the at least one second plate;

the at least one axle is fixedly connected to the second surface of the at least one resilient member via the at least one second plate.

15. The support structure of claim 14, wherein:

the at least one first plate has a first radius of curvature in a plane parallel to the at least one axle;

the at least one second plate has a second radius of curvature in the plane parallel to the at least one axle;

the at least one first plate and the at least one second plate define a first virtual pivot point in the plane parallel to the at least one axle for the support structure at a common center of curvature, the at least one axle being positioned between the at least one second plate and the at least one virtual pivot point.

16. The support structure of claim 5, wherein the at least one resilient member comprises two resilient members, one resilient member being positioned on each lateral side of the at least one axle, a void being present between the two resilient members to allow the at least one axle to move by rotation or by vertical translation toward and away from the at least one plate.

17. The support structure of claim 10, wherein a cross-section of the at least one resilient member has a butterfly shape causing deformations of the at least one resilient member to take place for a major part on lateral extremities upon movement of the at least one axle.

18. The support structure of claim 14, wherein the at least one resilient member defines a concavity on each of its lateral sides when the at least one axle is in a resting position, one of the concavities on a first side of the at least one axle being replaced by a bulge defined by the at least one resilient member when the first side of the at least one axle is raised toward the at least one plate.

19. A track system comprising the support structure of claim 1.

* * * * *